United States Patent
Carr

(10) Patent No.: US 12,418,059 B2
(45) Date of Patent: Sep. 16, 2025

(54) SYSTEMS AND METHODS FOR BATTERY CELL RECYCLING

(71) Applicant: GM GLOBAL TECHNOLOGY OPERATIONS LLC, Detroit, MI (US)

(72) Inventor: Alex Carr, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 530 days.

(21) Appl. No.: 17/933,154

(22) Filed: Sep. 19, 2022

(65) Prior Publication Data

US 2024/0097223 A1    Mar. 21, 2024

(51) Int. Cl.
*H01M 10/54*          (2006.01)
(52) U.S. Cl.
CPC .................................. *H01M 10/54* (2013.01)
(58) Field of Classification Search
CPC .......... H10M 10/54; Y02E 60/10; B02C 9/18; B02C 23/10; B02C 21/00
See application file for complete search history.

(56) References Cited

U.S. PATENT DOCUMENTS

| | | | | |
|---|---|---|---|---|
| 5,437,236 | A * | 8/1995 | Zeiner ...................... | A47B 9/10 312/231 |
| 6,439,218 | B1 * | 8/2002 | Hulett ...................... | B27B 27/10 125/11.22 |
| 2019/0027794 | A1 * | 1/2019 | Fung ........................ | B02C 23/10 |

FOREIGN PATENT DOCUMENTS

| | | | | |
|---|---|---|---|---|
| CN | 1460054 | A  * | 12/2003 | ............. B23D 45/06 |
| EP | 2512931 | B1 * | 4/2019 | ........... B31B 50/726 |

OTHER PUBLICATIONS

Osterhout et al., Systems and Methods for Creating a Manufacturer's Joint and Closing a Box, Apr. 2019, See the Abstract. (Year: 2019).*

Amonette et al., Safety System of Power Driving Device, Dec. 2003, See the Abstract. (Year: 2003).*

* cited by examiner

*Primary Examiner* — Niki Bakhtiari
*Assistant Examiner* — Monique M Wills
(74) *Attorney, Agent, or Firm* — Ingrassia Fisher & Lorenz, LLP | IF&L

(57) ABSTRACT

A battery cell recycling system includes a recycling table having a first table surface opposite a second table surface and at least one collection slot defined through the first table surface and the second table surface. The battery cell recycling system includes a battery guide system to receive a battery cell including a first lead tab, a second lead tab and a pouch. The battery guide system is movable between a first position and a second position in which at least one of the first lead tab, the second lead tab and the pouch is disposed over the collection slot. The battery cell recycling system includes at least one actuator configured to move at least one cutting blade to remove at least one of the first lead tab, the second lead tab and the pouch from the battery cell in the second position.

20 Claims, 16 Drawing Sheets

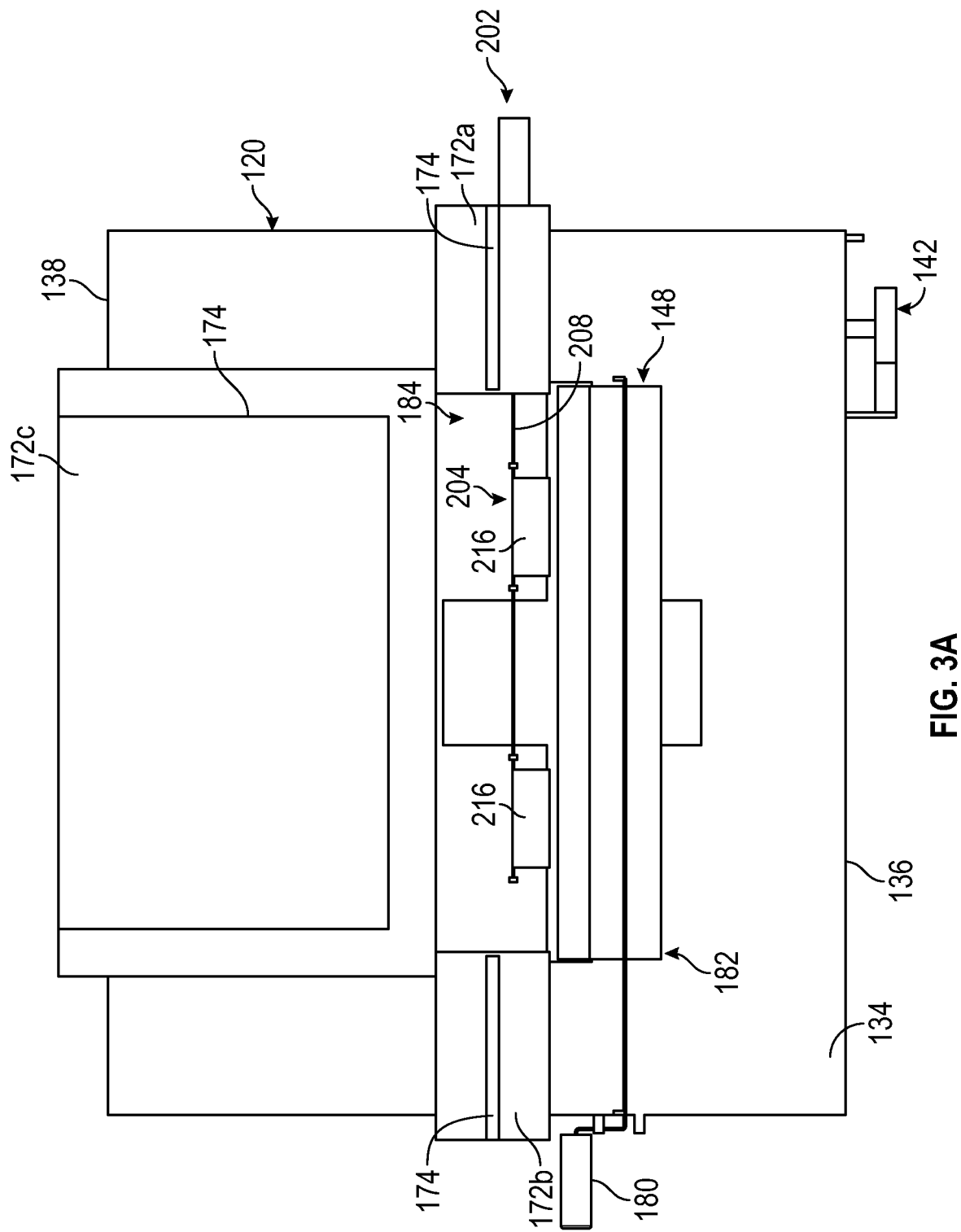

SYSTEMS AND METHODS FOR BATTERY CELL RECYCLING

INTRODUCTION

The technical field generally relates to systems and methods for battery cell recycling, and more particularly relates to systems and methods for battery cell recycling for battery cells associated with a vehicle in which at least lead tabs associated with the battery cells are separated from the battery cell for recycling.

Many battery electric vehicles include one or more battery cells, which supply energy for use by various systems associated with the vehicle. During manufacture of the battery cells, one or more of the battery cells may not be acceptable for use. In these instances, the battery cell may be recycled. In order to recycle the battery cell, battery lead tabs associated with the battery cell are removed to reduce a risk of shorting the battery cell. The removal of the battery cell lead tabs manually, however, is time consuming and may be challenging for an operator to perform. In addition, in certain instances, depending upon the particular battery cell, the battery cell may have undergone a chemical reaction, which makes a shape of the battery cell difficult to position within a recycling receptacle.

Thus, it is desirable to provide systems and methods for battery cell recycling, in which the battery cell lead tabs are removed efficiently, and without requiring a manual operation. In addition, it is desirable to provide systems and methods for battery cell recycling, in which the size of the battery cell is uniform for positioning within a recycling receptacle. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a battery cell recycling system. The battery cell recycling system includes a recycling table having a first table surface opposite a second table surface. The recycling table includes at least one collection slot defined through the first table surface and the second table surface, and at least one collection bin coupled to the second table surface in communication with the at least one collection slot. The battery cell recycling system includes a battery guide system coupled to the recycling table. The battery guide system is configured to receive a battery cell including a first lead tab, a second lead tab and a pouch. The battery guide system is movable between a first position and a second position, and in the second position, at least one of the first lead tab, the second lead tab and the pouch is disposed over the at least one collection slot. The battery cell recycling system includes at least one actuator configured to move at least one cutting blade to remove at least one of the first lead tab, the second lead tab and the pouch from the battery cell in the second position of the battery guide system such that the at least one of the first lead tab, the second lead tab and the pouch is received in the at least one collection bin.

The battery cell recycling system includes a safety system disposed proximate the battery guide system configured to observe whether a user has crossed the safety system and to generate signals based on the observation. The battery cell recycling system includes a controller, having a processor, configured to receive the signals from the safety system that indicate the user has crossed the safety system and inhibit a motion of the at least one actuator based on the signals. The battery cell recycling system includes a human-machine interface in communication with the controller, and the human-machine interface is configured to receive input from the user to reset the safety system and to actuate the at least one actuator. Based on the input from the user to reset the safety system and to actuate the at least one actuator, the controller is configured to output one or more control signals to the at least one actuator to move the at least one cutting blade. The at least one collection slot includes a plurality of collection slots defined through the recycling table from the first table surface to the second table surface, the at least one collection bin includes a plurality of collection bins, and each of the plurality of collection slots is in communication with a respective one of the plurality of collection bins. The at least one cutting blade includes a first tab cutting blade, a second tab cutting blade and a pouch cutting blade, each of the first tab cutting blade and the second tab cutting blade are configured to remove a respective one of the first lead tab and the second lead tab, and the pouch cutting blade is configured to remove the pouch. The battery cell recycling system includes a tape dispenser coupled to the recycling table. The battery cell recycling system includes a folding arm coupled to the recycling table and movable relative to the recycling table to fold the pouch over the battery cell. The battery cell recycling system includes at least one ramp surface configured to contact the pouch and guide the pouch as the battery guide system moves between the first position and the second position.

Further provided according to various embodiments is a method for battery cell recycling. The method includes providing a recycling table having a first table surface opposite a second table surface. The recycling table includes at least one collection slot defined through the first table surface and the second table surface and at least one collection bin coupled to the second table surface in communication with the at least one collection slot. The recycling table includes a safety system coupled to the recycling table configured to observe whether a user has crossed the safety system and to generate signals based on the observation. The method includes receiving, by a processor, user input to cut at least one of a first lead tab, a second lead tab and a pouch associated with a battery cell, and receiving, by the processor, the signals from the safety system. The method includes outputting one or more control signals, by the processor, to at least one actuator to move at least one cutting blade to remove at least one of the first lead tab, the second lead tab and the pouch associated with the battery cell such that the at least one of the first lead tab, the second lead tab and the pouch is received in the at least one collection bin based on the signals from the safety system.

Based on the signals from the safety system, the method includes inhibiting a movement of the at least one cutting blade by the at least one actuator. The at least one collection slot includes a plurality of collection slots, the at least one collection bin includes a plurality of collection bins, each of the plurality of collection bins is associated with a respective one of the plurality of collection slots, and receiving the user input to cut the at least one of the first lead tab, the second lead tab and the pouch associated with the battery cell includes receiving, by the processor, user input to cut the first lead tab and the second lead tab, and outputting the one or more control signals, by the processor, to the at least one actuator to move a first tab cutting blade and a second tab cutting blade to remove the first lead tab and the second lead tab such that the first lead tab is received in one of the plurality of collection bins and the second lead tab is received in a second one of the plurality of collection bins based on the signals from the safety system. The at least one collection slot includes a plurality of collection slots, the at least one collection bin includes a plurality of collection bins, each of the plurality of collection bins is associated with a respective one of the plurality of collection slots, and receiving the user input to cut the at least one of the first lead tab, the second lead tab and the pouch associated with the battery cell includes receiving, by the processor, user input to cut the first lead tab, the second lead tab and the pouch, outputting one or more control signals, by the processor, to a first actuator to move a first tab cutting blade and a second tab cutting blade to remove the first lead tab and the second lead tab such that the first lead tab is received in one of the plurality of collection bins and the second lead tab is received in a second one of the plurality of collection bins based on the signals from the safety system, and outputting one or more control signals, by the processor, to a second actuator to move a pouch cutting blade to remove the pouch such that the pouch is received in a third one of the plurality of collection bins based on the signals from the safety system.

Also provided is a battery cell recycling system. The battery cell recycling system includes a recycling table having a first table surface opposite a second table surface. The recycling table includes a plurality of collection slots defined through the first table surface and the second table surface, a plurality of collection bins coupled to the second table surface in communication with a respective one of the plurality of collection slots and a safety system disposed proximate a first table end of the recycling table. The safety system is configured to observe whether a user has crossed the safety system and to generate signals based on the observation. The battery cell recycling system includes a battery guide system coupled to the recycling table. The battery guide system is configured to receive a battery cell including a first lead tab, a second lead tab and a pouch. The battery guide system is movable between a first position and a second position, and in the second position, the first lead tab, the second lead tab and the pouch are disposed over a respective one of the plurality of collection slots. The battery cell recycling system includes a controller, having a processor, configured to receive the signals from the safety system and output one or more control signals to at least one actuator based on the signals from the safety system. The at least one actuator is configured to move at least one cutting blade to remove at least one of the first lead tab, the second lead tab and the pouch from the battery cell in the second position of the battery guide system such that the at least one of the first lead tab, the second lead tab and the pouch is received in the respective one of the plurality of collection bins.

The battery cell recycling system includes a human-machine interface in communication with the controller, and the human-machine interface is configured to receive input from the user to reset the safety system and to actuate the at least one actuator. Based on the input from the user to reset the safety system and to actuate the at least one actuator, the controller is configured to output the one or more control signals to the at least one actuator to move the at least one cutting blade. The at least one cutting blade includes a first tab cutting blade, a second tab cutting blade and a pouch cutting blade that are electrically isolated from each other, each of the first tab cutting blade and the second tab cutting blade are configured to remove a respective one of the first lead tab and the second lead tab, and the pouch cutting blade is configured to remove the pouch. The battery cell recycling system includes a tape dispenser coupled to the recycling table and a folding arm coupled to the recycling table and movable relative to the recycling table to fold the pouch over the battery cell. The battery cell recycling system includes at least one ramp surface configured to contact the pouch and guide the pouch as the battery guide system moves between the first position and the second position.

BRIEF DESCRIPTION OF THE DRAWINGS

The exemplary embodiments will hereinafter be described in conjunction with the following drawing figures, wherein like numerals denote like elements, and wherein:

FIG. 3A is a bottom view of the recycling table, in which the pair of block arms are in the first position and the folding arm is in the first position;

DETAILED DESCRIPTION

Figure 1:
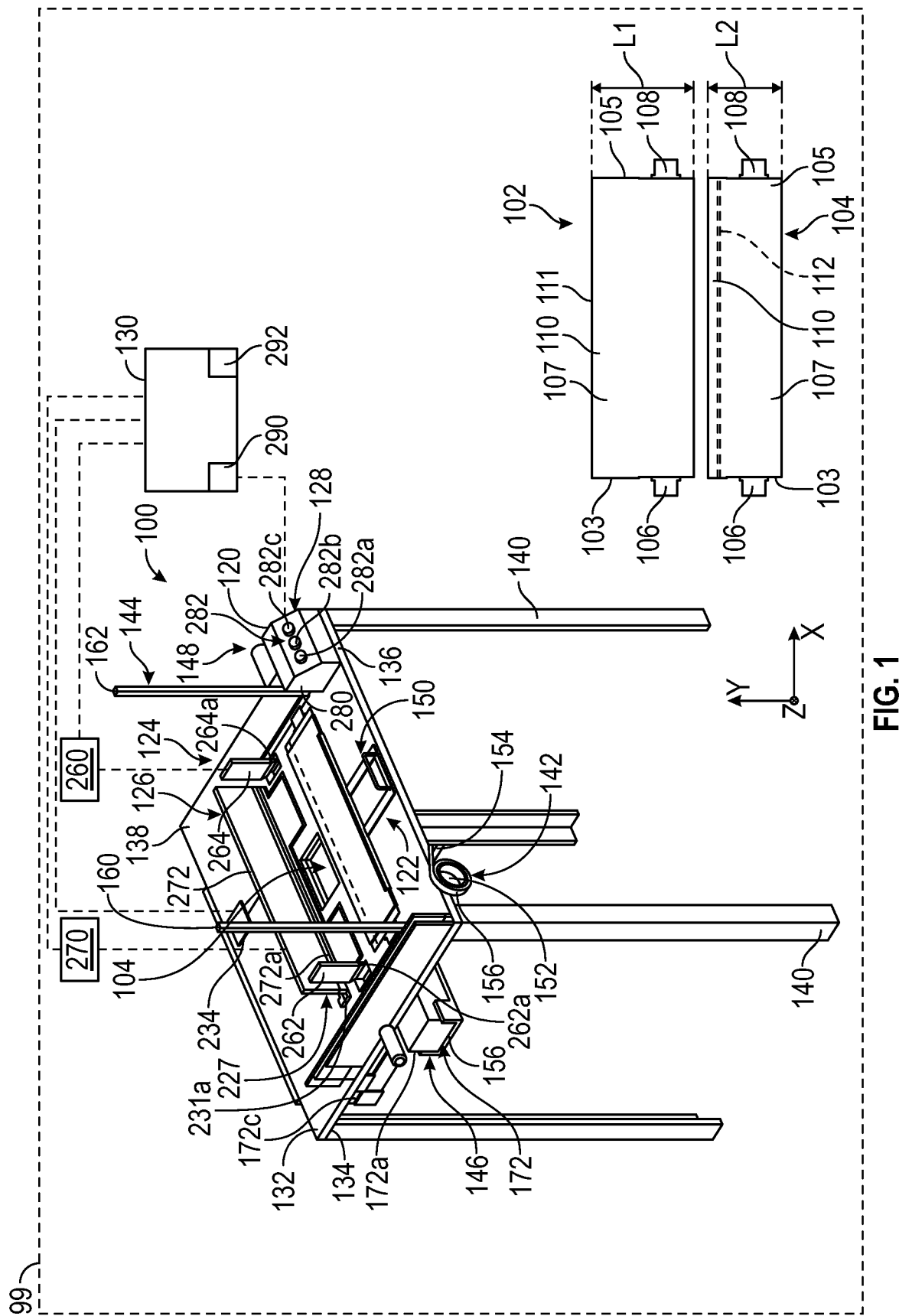
FIG. 1 is a functional block diagram illustrating a manufacturing system including a battery cell recycling system in accordance with various embodiments.

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. Also, as used herein, the terms "about" and "substantially" denote within 10% to account for manufacturing tolerances.

Figure 1A:
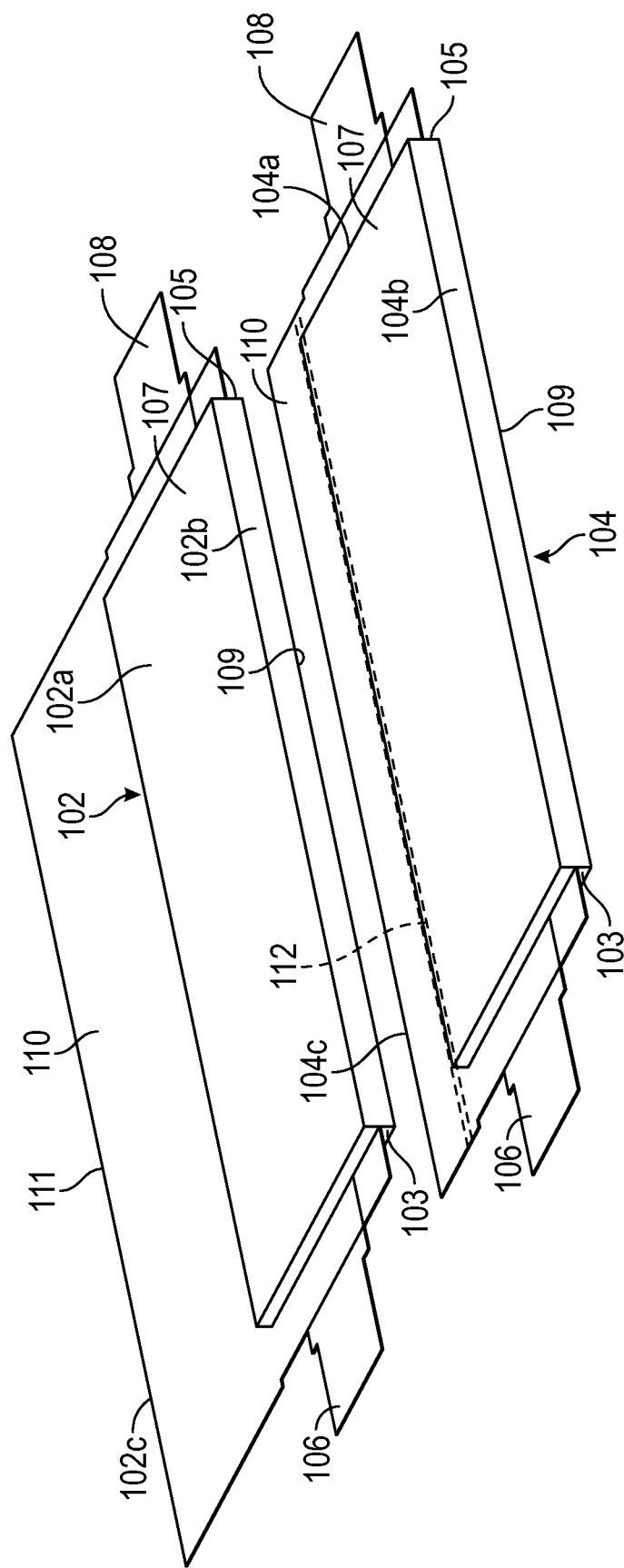
FIG. 1A is a side perspective view of a first battery cell and a second battery cell associated with the battery cell recycling system.
Figure 1B:
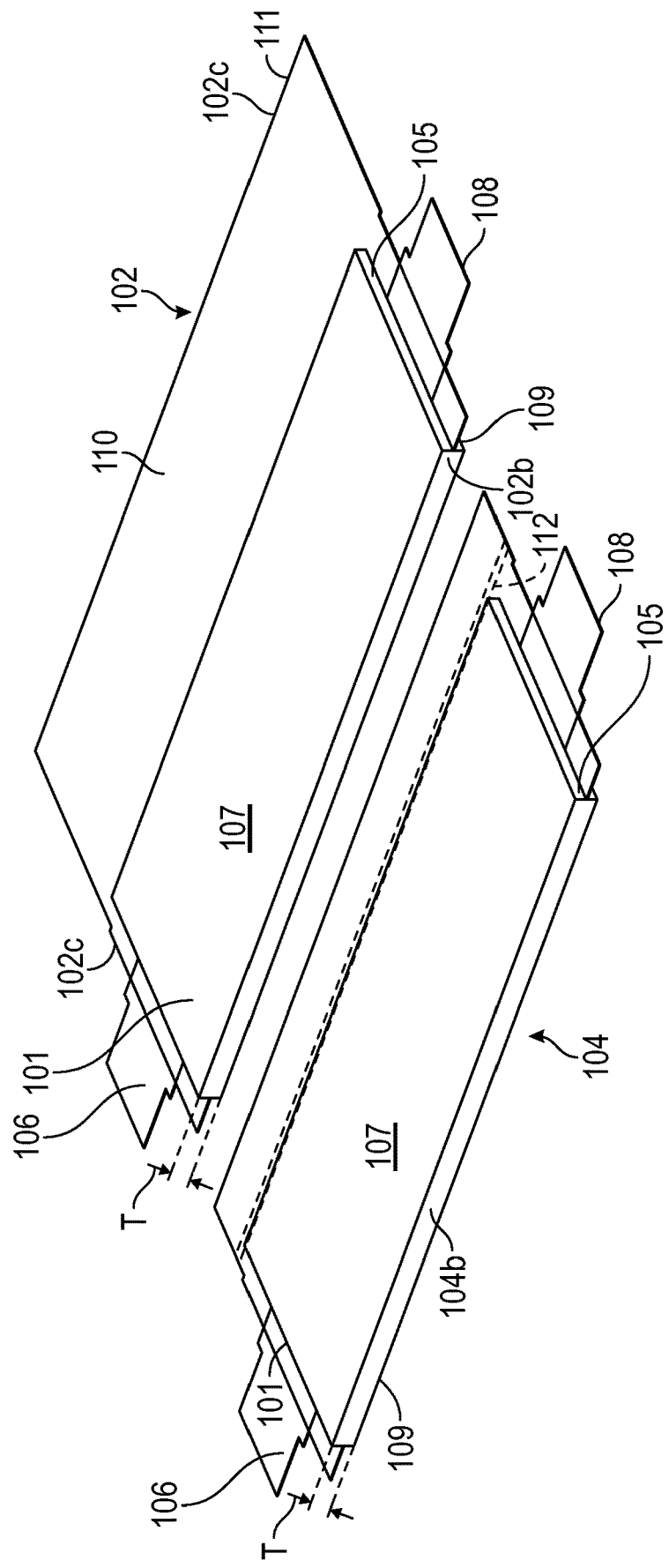
FIG. 1B is a side perspective view of the first battery cell and the second battery cell associated with the battery cell recycling system.

With reference to FIG. 1, an exemplary battery cell recycling system 100 is shown. The battery cell recycling system 100 is used to recycle a first type of battery cell 102 (generally referred to herein as "first battery cell 102") and a second type of battery cell 104 (generally referred to herein as "second battery cell 104") within a manufacturing system 99. The manufacturing system 99 may also include a source of the battery cells 102, 104, such as a battery cell production line, which assembles the first battery cell 102 and the second battery cell 104, for example. Each of the first battery cell 102 and the second battery cell 104 are lithium ion battery cells, however, the first battery cell 102 and the second battery cell 104 may be composed of alternative materials for supplying energy to a vehicle, for example. In this example, each of the first battery cell 102 and the second battery cell 104 include a first lead tab 106 and a second lead tab 108 on opposite sides 103, 105 of the battery cell 102, 104. The first lead tab 106 is composed of aluminum, and the second lead tab 108 is composed of copper. With reference to FIG. 1A, the first lead tab 106 of the battery cell 102, 104 is coupled to the battery cell 102, 104 so as to extend outwardly from the side 103 and so as to be positioned between opposite surfaces 107, 109 of the respective battery cell 102, 104. The battery cell recycling system 100 is configured to remove the first lead tab 106 from the battery cell 102, 104 without contacting the side 103 of the battery cell 102, 104. Stated another way, the battery cell recycling system 100 removes the first lead tab 106 without cutting through a respective housing or enclosure 102a, 104a of the battery cell 102, 104. In this example, the first lead tab 106 and the second lead tab 108 are positioned proximate a first end 102b, 104b of the respective battery cell 102, 104. With reference to FIG. 1B, the second lead tab 108 of the battery cell 102, 104 is coupled to the battery cell 102, 104 so as to extend outwardly from the side 105 and so as to be positioned between the surfaces 107, 109 of the respective battery cell 102, 104. The battery cell recycling system 100 is configured to remove the second lead tab 108 from the battery cell 102, 104 without contacting the side 105 of the battery cell 102, 104. Stated another way, the battery cell recycling system 100 removes the second lead tab 108 without cutting through the enclosure 102a, 104a of the battery cell 102, 104. Each of the first lead tab 106 and the second lead tab 108, once removed from the battery cell 102, 104, may be recycled and reused for subsequent battery cells, for example. Generally, the battery cell 102, 104 has a thickness T in a first portion 101 of each of the battery cells 102, 104. The first portion 101 of the battery cells 102, 104 includes the lead tabs 106, 108, and extends from the first end 102b, 104b to a pouch 110. The thickness T is about 10 millimeters (mm).

Each of the battery cells 102, 104 includes the pouch 110. The pouch 110 extends from proximate the lead tabs 106, 108 to the second end 102c, 104c of the respective battery cell 102, 104. The pouch 110 is expandable based on a chemical reaction occurring within the battery cell 102, 104. In the example of the first battery cell 102, the pouch 110 is expanded and has a length L1 as the pouch 110 of the first battery cell 102 is filled with gas from the chemical reaction within the first battery cell 102. The length L1 is different and larger than a length L2 of the pouch 110 of the second battery cell 104. In one example, the length L1 is greater than the length L2 by about 60 millimeters (mm). The length L2 of the second battery cell 104 is different and less than the length L1 as the chemical reaction has already occurred in the second battery cell 104 and the pouch 110 has already been trimmed during the manufacture of the second battery cell 104. The length L1 of the pouch 110 provides a visual indicator as to whether the chemical reaction has occurred within the first battery cell 102. Each of the first battery cell 102 and the second battery cell 104 also include a seal 111, 112. The seal 111, 112 encloses the contents of the respective first battery cell 102 and the second battery cell 104. In the example of the first battery cell 102, the seal 111 is at the second end 102c of the pouch 110 and spaced a distance apart from the lead tabs 106, 108. In the example of the second battery cell 104, the seal 112 is proximate or adjacent to the lead tabs 106, 108 as the pouch 110 has been trimmed during manufacturing. As will be discussed, in instances where the pouch 110 has been trimmed during manufacturing and the seal 112 is proximate the lead tabs 106, 108 or the second battery cell 104 has the length L2, the pouch 110 may be further removed to assist in recycling the second battery cell 104.

In this example, the battery cell recycling system 100 is positioned within the manufacturing system 99 to assist in recycling the battery cells 102, 104 that are unacceptable. In one example, the battery cell recycling system 100 includes a recycling table 120, a battery guide system 122, a battery lead tab cutting system 124, a battery pouch cutting system 126, a human-machine interface 128 and a controller 130.

The recycling table 120 supports the battery guide system 122, the battery lead tab cutting system 124, the battery pouch cutting system 126, the human-machine interface 128 and the controller 130. The recycling table 120 may be in communication with a source of power, pressurized air, etc. associated with the manufacturing system 99. In one example, the recycling table 120 is substantially rectangular, however, the recycling table 120 may have any desired shape. The recycling table 120 has a first table surface 132 opposite a second table surface 134, and a first table end 136 opposite a second table end 138. The battery guide system 122, the human-machine interface 128 and the controller 130 are generally coupled to the first table surface 132. The second table surface 134 generally includes one or more support structures, such as legs 140, which elevate the first table surface 132 to a height suitable for an operator to interface with the battery guide system 122, the battery lead tab cutting system 124, the battery pouch cutting system 126 and the human-machine interface 128. In one example, the recycling table 120 also includes a tape dispenser 142, a safety system 144, a collection system 146, a pouch folding system 148, a guide system 150 and a verification gauge 151.

Figure 2:
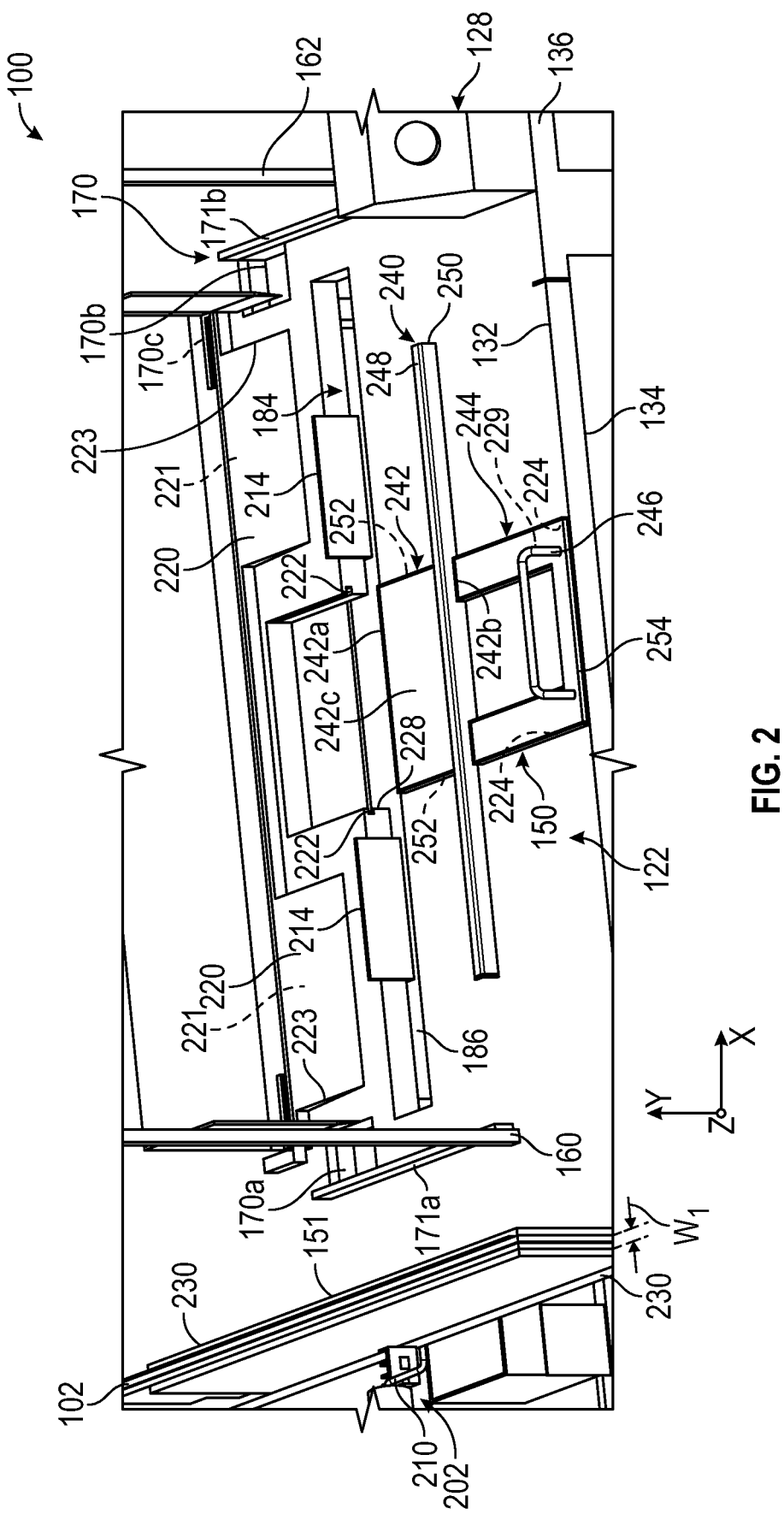
FIG. 2 is a detail view of a recycling table of the battery cell recycling system, in which a battery guide system is in a first position, a pair of ramp surfaces are in a first position and a pair of block arms are in a second position.
Figure 2A:
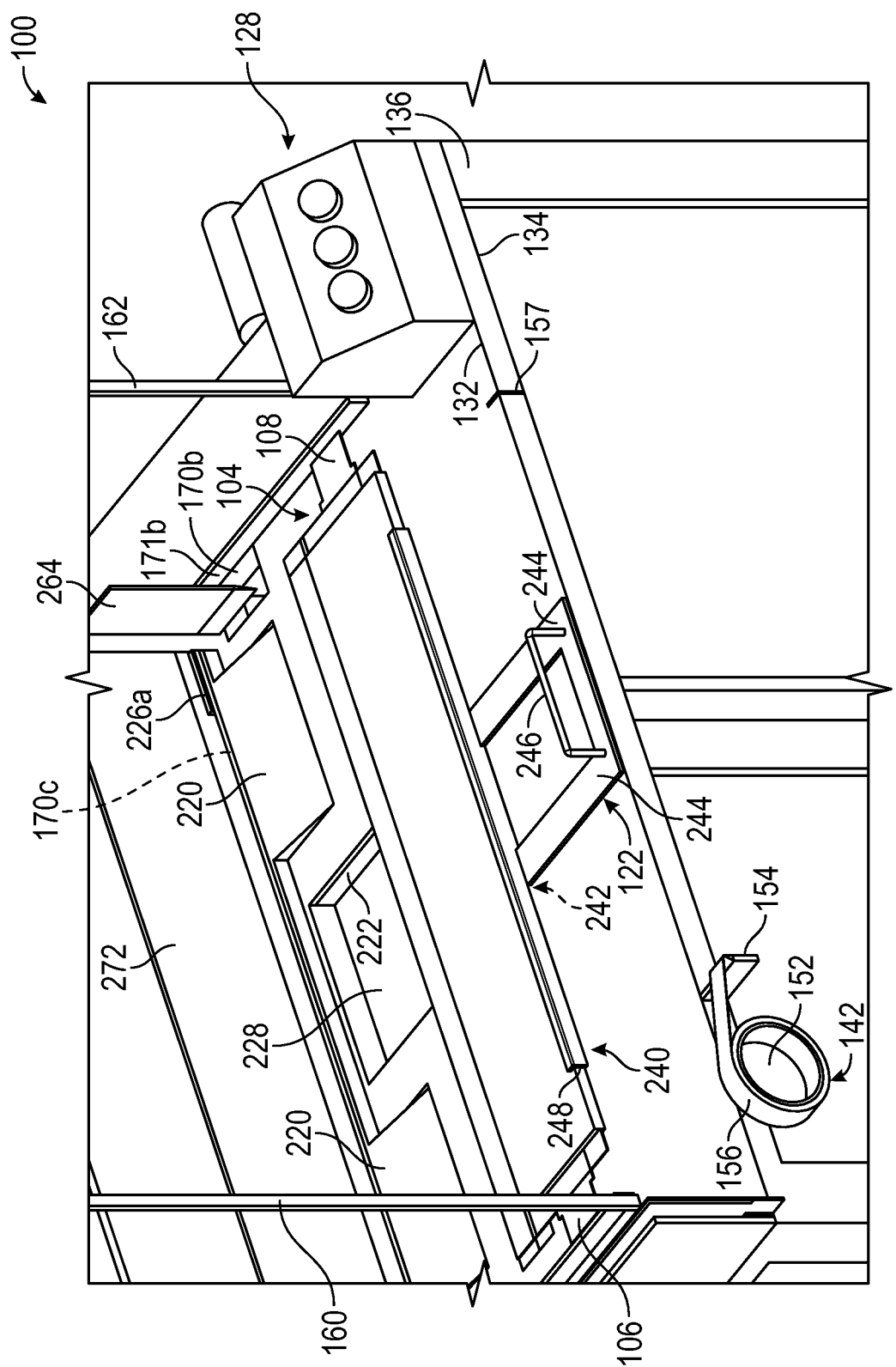
FIG. 2A is a perspective view of the recycling table of the battery cell recycling system, in which a battery cell is coupled to the battery guide system, and the battery guide system and the pair of ramp surfaces are in the first position.

In one example, the tape dispenser 142 dispenses a strip of adhesive tape, which is used to secure the pouch 110 when folded by the pouch folding system 148. In this example, the tape dispenser 142 is coupled to the first table end 136, however, the tape dispenser 142 may be coupled at any suitable location on the recycling table 120. The recycling table 120 may include a post 152 and a cutting blade 154 at the first table end 136. The post 152 may be cylindrical and sized to receive a roll 156 of the adhesive tape. The cutting blade 154 may be composed of metal or metal alloy, and may include a plurality of small teeth, which may be used to cut the adhesive tape from the roll 156 into strips. With reference to FIG. 2A, the first table end 136 may include a marking 157 spaced a distance apart from the cutting blade 154. The marking 157 is a visual indicator to the operator of a predetermined amount or length of adhesive tape needed to tape the pouch 110 to the first battery cell 102. The marking 157 may be a red mark, etch, etc. defined in the recycling table 120 at the first table end 136. It should be noted that in other examples, the tape dispenser 142 may be configured to dispense tape at the predetermined length to tape the pouch 110 to the first battery cell 102.

The safety system 144 is disposed proximate the battery guide system 122 to observe whether the operator is in contact with the battery guide system 122 in the second position. In one example, the safety system 144 is a light curtain, which includes a photoelectric transmitter bar 160 and a receiver bar 162 disposed on either side of the battery guide system 122 proximate the first table end 136. In the example of the safety system 144 as the light curtain, the light curtain observes whether the user has crossed the light curtain and generates signals based on the observation. The transmitter bar 160 and the receiver bar 162 are each in communication with the controller 130 over a communication medium that facilitates the transfer of data, power, etc., including, but not limited to, a bus. The transmitter bar 160 includes a plurality of light emitting elements, such as light emitting diodes, which emit infrared light when energized. The light emitting elements are generally arranged to emit a plurality of parallel infrared light beams based on one or more control signals received from the controller 130. The receiver bar 162 is spaced apart from the transmitter bar 160, and is configured to receive the light emitted by the light emitting elements of the transmitter bar 160. The receiver bar 162 includes a plurality of phototransistors. Generally, the plurality of light emitting elements of the transmitter bar 160 are sequenced and modulated, and the phototransistors of the receiver bar 162 detect the specific pulse and frequency of a particular one of the light emitting elements associated with the transmitter bar 160. If any of the phototransistors of the receiver bar 162 do not receive the infrared light beam from the associated light emitting element, the receiver bar 162 outputs one or more signals to the controller 130 that the light beam was not detected. If the light beam is not detected, the safety system 144 is in an alert state, which indicates that the operator has crossed the safety system 144 or has crossed one of the light beams output by the transmitter bar 160. If the light beam is detected, the safety system 144 is in an active state. Generally, the safety system 144 is disposed proximate the first table end 136, and is positioned in front of the battery lead tab cutting system 124 and the battery pouch cutting system 126 on the recycling table 120 to ensure that an operator is not proximate either the battery lead tab cutting system 124 or the battery pouch cutting system 126 during operation. The transmitter bar 160 and the receiver bar 162 extend from the first table surface 132 along a vertical or Y-axis. The first table end 136 is opposite the second table end 138 in a Z-direction, which is perpendicular to the Y-axis.

Figure 2B:
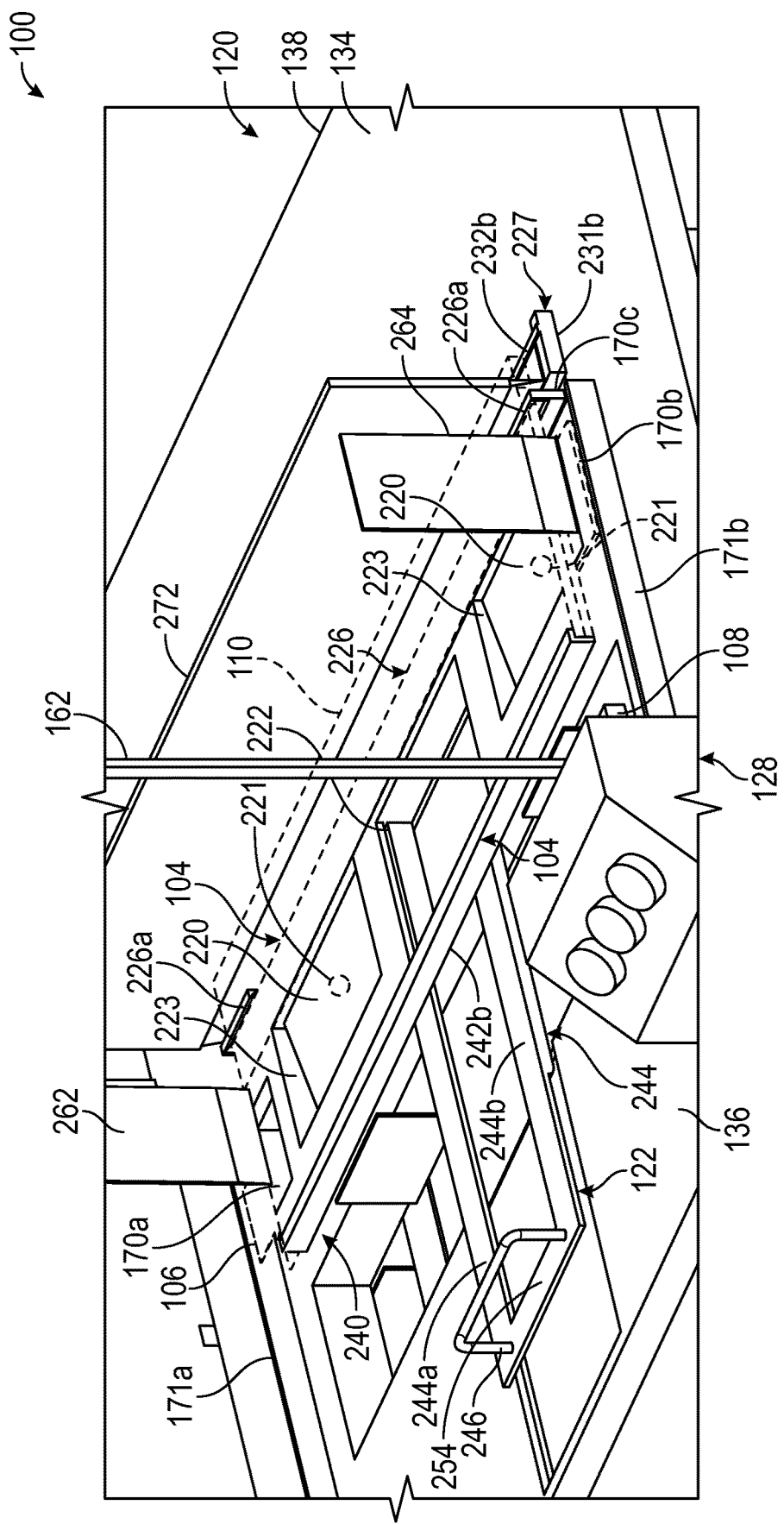
FIG. 2B is a perspective view of the recycling table of the battery cell recycling system, in which the second battery cell is coupled to the battery guide system, and the battery guide system and the pair of ramp surfaces are in the second position.

The collection system 146 includes a plurality of collection slots 170 and a plurality of collection bins 172. In one example, the plurality of collection slots 170 includes three collection slots 170a-170c. The collection slots 170a-170c are defined to extend through the first table surface 132 and the second table surface 134. With reference to FIG. 2, the collection slots 170a, 170b are defined on opposed sides of the battery guide system 122. The collection slots 170a, 170*b* are substantially rectangular, and are sized to receive a respective one of the lead tabs 106, 108 (FIG. 1). In one example, the collection slot 170*a* receives the first lead tab 106, and the collection slot 170*b* receives the second lead tab 108. With reference to FIG. 2B, the recycling table 120 includes two guide rails 171*a*, 171*b*, which are coupled to the first table surface 132 proximate or adjacent to the collection slots 170*a*, 107*b*. The guide rails 171*a*, 171*b* extend from the respective one of the transmitter bar 160 and the receiver bar 162 toward the second table end 138. The guide rails 171*a*, 171*b* provide a physical and visual indicator as to the alignment of the lead tabs 106, 108 on the recycling table 120 as the battery cell 102, 104 is advanced by the battery guide system 122 for the cutting operation. With reference back to FIG. 2, the collection slots 170*a*, 170*b* are defined along an end of the respective guide rail 171*a*, 171*b* opposite the transmitter bar 160 and the receiver bar 162 to receive the respective lead tab 106, 108 at the end of the cutting operation. The collection slot 170*c* is defined adjacent to the battery guide system 122. Generally, the collection slot 170*c* extends along a horizontal or X-axis of the recycling table 120, with the Y-axis perpendicular to the X-axis. The collection slots 170*a*, 170*b* are in communication with the battery lead tab cutting system 124, and the collection slot 170*c* is in communication with the battery pouch cutting system 126.

Figure 3:
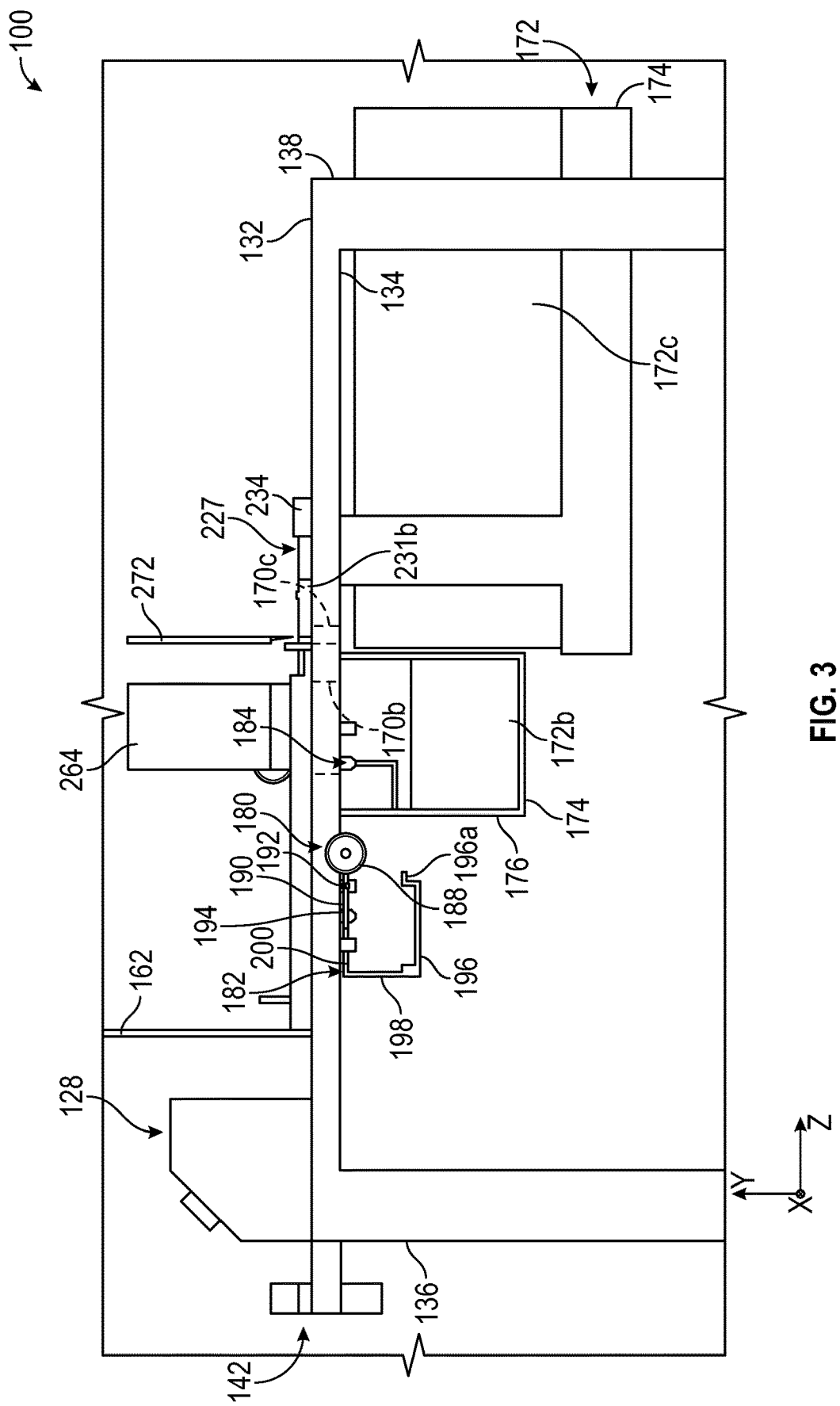
FIG. 3 is a side view of the recycling table, in which the pair of block arms are in the first position and a folding arm is in a first position.

With reference to FIGS. 1, 3 and 3A, the plurality of collection bins 172 are coupled to the second table surface 134. In one example, the plurality of collection bins 172 includes three collection bins 172*a*-172*c*. The collection bins 172*a* (FIG. 1), 172*b* (FIG. 3) are each coupled to the second table surface 134 so as to be disposed directly beneath a respective one of the collection slots 170*a*, 170*b* and in communication with the respective one of the collection slots 170*a*, 170*b*. The collection bin 172*c* is coupled to the second table surface 134 so as to be disposed directly beneath the collection slot 170*c* and in communication with the collection slot 170*c*. The collection bins 172*a*-172*c* may be composed of metal, metal alloy or a polymer-based material, and may be cast, stamped, molded, additively manufactured, etc. The collection bins 172*a*-172*c* are each coupled to the second table surface 134 so as to be removable from the recycling table 120. For example, the second table surface 134 may include one or more shelves 174, which are coupled to the second table surface 134 by a pair of support arms 176. The shelves 174 are spaced apart from the second table surface 134 by the support arms 176 so that the respective collection bin 172*a*-172*c* may be positioned between the shelf 174 and the second table surface 134. In one example, the support arms 176 may have an L-shape such that respective pairs of support arms 176 define the shelf 174. By removably coupling the collection bins 172*a*-172*c* to the recycling table 120, the collection bins 172*a*-172*c* may be removed once filled, emptied, and returned to the recycling table 120 for reuse.

Figure 9:
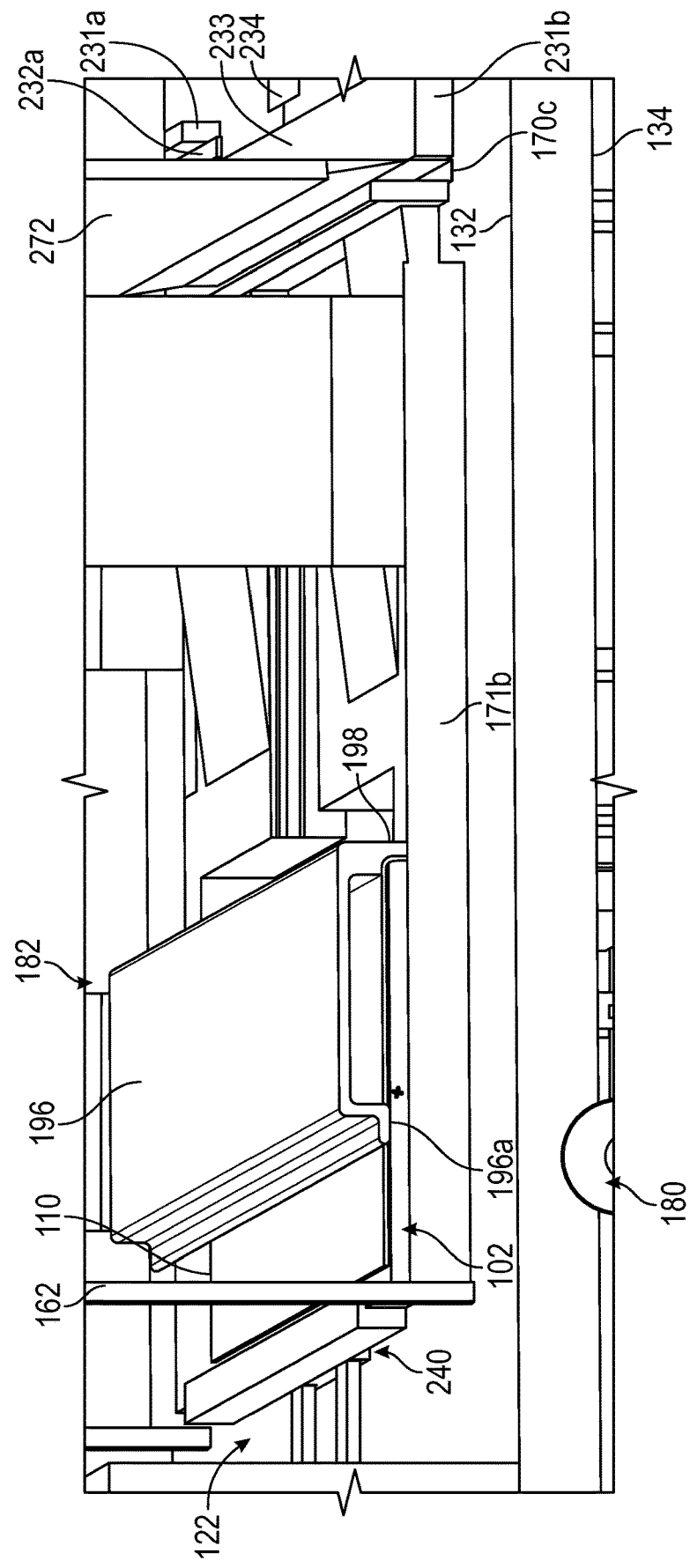
FIG. 9 is a side perspective view of the recycling table, in which the first battery cell is coupled to the battery guide system, the battery guide system is in the first position, the block arms are in the first position, and the folding arm is in a second position to fold the pouch associated with the first battery cell over the first battery cell.

The pouch folding system 148 assists the operator in reducing a size of the first battery cell 102. In this regard, as the chemical reaction has occurred within the first battery cell 102, and the pouch 110 is expanded, the pouch 110 is not cut to reduce a size of the first battery cell 102 for further recycling. Instead, in order to package the first battery cell 102 for further recycling, the pouch 110 is folded over and taped with the adhesive strip from the tape dispenser 142. With reference to FIG. 3, the pouch folding system 148 includes a handle 180 and a folding arm 182. The handle 180 is movable or rotatable relative to the recycling table 120 to move the folding arm 182. In one example, the recycling table 120 includes a fold slot 186 (FIG. 2) through which the folding arm 182 is received. The handle 180 is coupled to the folding arm 182 such that a rotation of the handle 180 results in a rotation of the folding arm 182. The handle 180 includes a graspable member 188 and a shaft 190. The graspable member 188 enables an operator to grab the handle 180 to rotate the handle 180 relative to the recycling table 120. In one example, the graspable member 188 is a knob. The recycling table 120 may include a flange 192, which projects outwardly from the second table surface 134 and receives the handle 180 in a first position. In the first position, the folding arm 182 is recessed or disposed below the second table surface 134. In a second position, the folding arm 182 extends through the fold slot 186 (FIG. 2) to fold the pouch 110 over the first battery cell 102 (FIG. 9). The shaft 190 is rotatably coupled to the recycling table 120 via one or more shaft flanges 194. The shaft flanges 194 may be substantially U-shaped, and may define a bore that receives the shaft 190 to enable the shaft 190 to rotate relative to the recycling table 120.

The folding arm 182 is coupled to the shaft 190. The folding arm 182 is substantially C-shaped, and includes a first folding arm 196, a second folding arm 198 and a base 200. The first folding arm 196 includes a lip 196*a*, which initially contacts the pouch 110 during a rotation of the handle 180. The first folding arm 196 is substantially parallel to the second table surface 134 or the Z-axis in the first position and the second position of the handle 180. The second folding arm 198 extends substantially perpendicular to the first folding arm 196, and is substantially parallel to the Y-axis in the first position and the second position. The second folding arm 198 is coupled to or integrally formed with the first folding arm 196, and is coupled to or integrally formed with the base 200. The second folding arm 198 is sized to enable the first folding arm 196 to extend through the fold slot 186, over the pouch 110 and the first battery cell 102 to hold the pouch 110 folded over the first battery cell 102 to enable the operator to secure the folded pouch 110 to the first battery cell 102. The base 200 is coupled to the shaft 190. In one example, the base 200 may be injection molded onto the shaft 190 or press fit onto shaft 190, however, mechanical fasteners may be used to couple the base 200 to the shaft 190. The base 200 is coupled to the shaft 190 such that the shaft 190 does not rotate relative to the base 200.

Figure 3B:
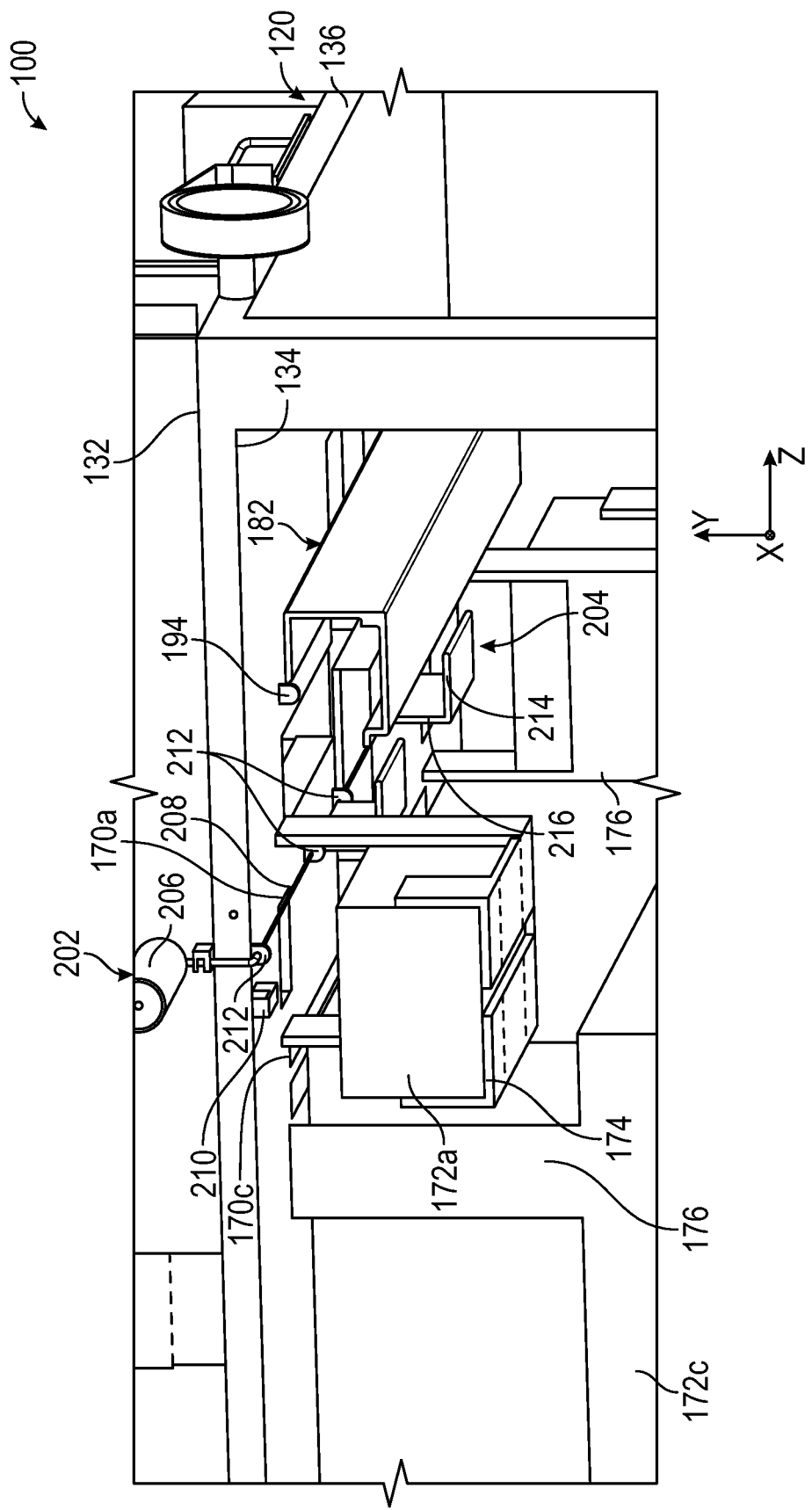
FIG. 3B is a bottom perspective view of the recycling table, in which the pair of block arms are in the first position and the folding arm is in the first position.

In one example, the recycling table 120 also includes a blocking arm system 184 rotatably coupled to the recycling table 120. With reference to FIG. 3B, the blocking arm system 184 includes a second handle 202 and a pair of block arms 204. The second handle 202 is movable or rotatable relative to the recycling table 120 to move the block arms 204 into the fold slot 186. The block arms 204 inhibit a movement of the battery cell 102, 104 rearward or away from a respective at least one of a first tab cutting blade 262, a second tab cutting blade 264 and a pouch cutting blade 272 during the cutting operation. The second handle 202 is coupled to the block arms 204 such that a rotation of the second handle 202 results in a rotation of the block arms 204. The second handle 202 includes a second graspable member 206 and a shaft 208. The second graspable member 206 enables an operator to grab the second handle 202 to rotate the second handle 202 relative to the recycling table 120. In one example, the second graspable member 206 is a knob. The recycling table 120 may include a flange 210 (see also FIG. 2), which projects outwardly from the second table surface 134 and receives the second handle 202 in the second position. In a first position, the block arms 204 are recessed or disposed below the second table surface 134. In the second position, the block arms 204 extend through the fold slot 186 (FIG. 2) to inhibit a movement of the battery cell 102, 104 during the cutting operation. Generally, in the first position, the second handle 202 is orientated about perpendicular to the first table surface 132. A rotation of the second handle 202 counterclockwise or toward the first table surface 132 by about 90 degrees moves the block arms 204 from the first position to the second position. The shaft 208 is rotatably coupled to the recycling table 120 via one or more shaft flanges 212. The shaft flanges 212 may be substantially U-shaped, and may define a bore that receives the shaft 208 to enable the shaft 208 to rotate relative to the recycling table 120.

The block arms 204 are each coupled to the shaft 208 so as to be spaced a distance apart along the shaft 208. Each of the block arms 204 is substantially L-shaped, and includes a first arm 214 and a second arm 216. The first arm 214 is substantially parallel to the second table surface 134 or the Z-axis in the first position of the second handle 202 and is substantially perpendicular to the second table surface 134 or the Z-axis in the second position of the second handle 202. The second arm 216 extends substantially perpendicular to the first arm 214, and is substantially parallel to the Y-axis in the first position and is perpendicular to the Y-axis in the second position. The second arm 216 is coupled to or integrally formed with the first arm 214. The second arm 216 is coupled to or integrally formed with the shaft 208. In one example, the second arm 216 may be injection molded onto the shaft 208 or press fit onto shaft 208, however, mechanical fasteners may be used to couple the second arm 216 to the shaft 208. The second arm 216 is coupled to the shaft 208 such that the shaft 208 does not rotate relative to the second arm 216.

Figure 4:
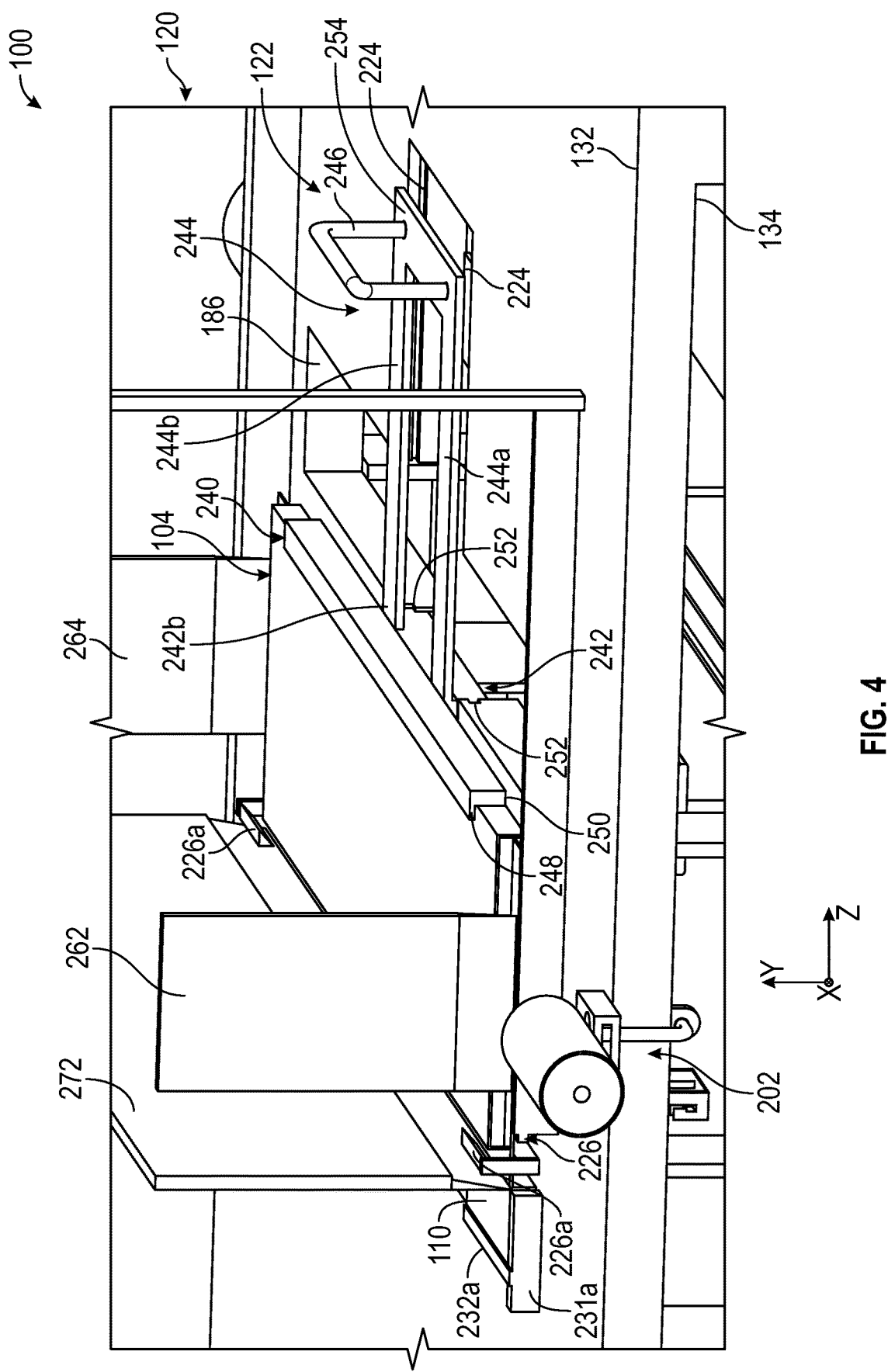
FIG. 4 is a side perspective view of the recycling table, in which the second battery cell is coupled to the battery guide system, the battery guide system is in the second position and the block arms are in the first position.

With reference to FIG. 2, the guide system 150 includes a pair of ramp surfaces 220, a pair of first channels 222, a pair of second channels 224 and a guide bar 226 (FIG. 4). The pair of ramp surfaces 220 are coupled to the first table surface 132 so as to be proximate a respective one of the first pair of channels 222. The pair of ramp surfaces 220 are generally positioned between the collection slots 170a, 170b and a guide slot 228 defined in the recycling table 120. The guide slot 228 is defined through the first table surface 132 and the second table surface 134, and enables a portion of the battery guide system 122 to move relative to the recycling table 120. The guide slot 228 is in communication with the fold slot 186. The pair of ramp surfaces 220 cooperate to support the battery cell 102, 104 during cutting of the battery cell 102, 104 by at least one of the battery lead tab cutting system 124 and the battery pouch cutting system 126. In one example, each of the ramp surfaces 220 is inclined with a positive angle relative to the first table surface 132 to assist in directing the pouch 110 upward, and over into the position for removal by the battery pouch cutting system 126, if desired. In this regard, in certain instances, the pouch 110 may sag, and the ramp surfaces 220 assist in guiding the pouch 110 up and over the collection slot 170c.

In this example, each of the ramp surfaces 220 are spring biased by a biasing member or spring 221, and are received within a respective pocket 223 defined in the first table surface 132. In one example, the spring 221 is a coiled compression spring, which biases the ramp surfaces 220 in a first position (FIG. 2) when the battery cell 102, 104 is not disposed over the ramp surfaces 220 for the cutting operation. In a second position, shown in FIG. 2B, the ramp surfaces 220 are positioned within the respective pocket 223 and each of the springs 221 are compressed by the weight of the battery cell 102, 104. When the battery cell 102, 104 is removed from the ramp surfaces 220, at the end of the cutting operation, the springs 221 bias the ramp surfaces 220 back to the first position (FIG. 2). Generally, the pocket 223 is defined at a depth into the first table surface 132 such that substantially an entirety of the respective ramp surface 220 and the spring 221 is contained within the pocket 223 when the battery cell 102, 104 is positioned over the ramp surfaces 220.

The first channels 222 are defined through opposed sides of guide slot 228 of the recycling table 120 so as to extend below the first table surface 132 and above the second table surface 134. The first channels 222 are substantially U-shaped, and receive a portion of the battery guide system 122. The first channels 222 guide a movement or translation of the portion of the battery guide system 122 relative to the recycling table 120.

With reference to FIG. 4, the second channels 224 are defined through the recycling table 120 from the first table surface 132 to the second table surface 134. In this example, the second channels 224 are defined through opposed sides of a second guide slot 229 of the recycling table 120 so as to extend below the first table surface 132 and above the second table surface 134. The second guide slot 229 (FIG. 2) is defined through the first table surface 132 and the second table surface 134, and enables a portion of the battery guide system 122 to move relative to the recycling table 120. The second guide slot 229 is in communication with the fold slot 186. Generally, the second channels 224 are defined proximate the first table end 136 (FIG. 2) and extend from proximate the first table end 136 to the fold slot 186 within the second guide slot 229. The second channels 224 receive the portion of the battery guide system 122 and guide the portion of the battery guide system 122 as the battery guide system 122 moves or translates relative to the recycling table 120. The second channels 224 are substantially co-planar with the first channels 222 to provide guidance for the battery guide system 122 as the battery guide system 122 moves relative to the recycling table 120.

The guide bar 226 is coupled to the first table surface 132 and extends upward from the first table surface 132 in the direction of the Y-axis. The guide bar 226 is substantially rectangular to provide a guide for the battery pouch cutting system 126 and ensures that the battery cell 102, 104 is flush during the cutting operation. The guide bar 226 also serves as a stop to limit further advancement of the battery cell 102, 104 by contacting the first portion 101 of the battery cell 102, 104 when the battery cell 102, 104 is positioned for the cutting operation (FIG. 4). In one example, with reference to FIG. 2B, the guide bar 226 includes a pair of guide slots 226a at opposite ends of the guide bar 226. The guide slots 226a are substantially C-shaped, and serve to direct the pouch 110 over the collection slot 170c for cutting by the battery pouch cutting system 126, if desired. The guide bar 226 is positioned adjacent to or along the collection slot 170c so as to face the first table end 136. A second guide bar assembly 227 may also be coupled proximate or along the collection slot 170c so as to face the second table end 138. The second guide bar assembly 227 extends along the collection slot 170c and provides a support for the pouch 110 during the cutting operation.

In one example, the second guide bar assembly 227 also assists in depositing the pouch 110 into the collection bin 172c after the cutting operation is completed. In this example, with reference to FIG. 8, the second guide bar assembly 227 includes a pair of guide rails 231a, 231b, a pair of fingers 232a, 232b, a movable guide bar 233 and a guide actuator 234. The guide rails 231a, 231b are coupled to the first table surface 132 so as to be on opposite sides of the pouch cutting blade 272. Each of the guide rails 231*a*, 231*b* includes a slot 235. Each slot 235 is sized to receive a portion of the movable guide bar 233. Each slot 235 guides a movement of the movable guide bar 233 relative to the first table surface 132. The guide rails 231*a*, 231*b* are coupled to the first table surface 132 to extend substantially along the Z-axis, and each slot 235 is defined in the respective guide rail 231*a*, 231*b* so as to extend in a direction substantially parallel to the Z-axis. Each finger 232*a*, 232*b* is coupled to a surface of a respective one of the guide rails 231*a*, 231*b* such that the fingers 232*a*, 232*b* are on opposite sides of the pouch cutting blade 272. Each finger 232*a*, 232*b* is coupled to a respective one of the guide rails 231*a*, 231*b* to extend substantially perpendicular to the Z-axis. The fingers 232*a*, 232*b* cooperate to push the pouch 110 into the collection bin 172*c* when the movable guide bar 233 is moved relative to the first table surface 132. It should be noted that while the fingers 232*a*, 232*b* are shown and described herein as comprising two discrete fingers, the fingers 232*a*, 232*b* may compose a single bar that extends between the guide rails 231*a*, 231*b*, if desired. Generally, the fingers 232*a*, 232*b* are coupled to the guide rails 231*a*, 231*b* to enable the movable guide bar 233 to move under the fingers 232*a*, 232*b* upon completion of the cutting operation for the pouch 110.

The movable guide bar 233 is slidably coupled to the slot 235 of the respective one of the guide rails 231*a*, 231*b*. The movable guide bar 233 is substantially rectangular, and is sized to support the pouch 110 during the cutting operation for the pouch 110. The movable guide bar 233 has a surface that supports the pouch 110, which is substantially planar or flush with a surface of the guide rails 231*a*, 231*b* to which the fingers 232*a*, 232*b* are coupled. In this example, with reference to FIG. 8A, the movable guide bar 233 includes flanges 236 on opposite ends that engage with the slot 235 of the respective guide rail 231*a*, 231*b* to guide the movement of the movable guide bar 233 relative to the first table surface 132. Generally, the movable guide bar 233 is movable from a first position, in which an end of the movable guide bar 233 is proximate the pouch cutting blade 272 during the cutting operation for the pouch 110 to a second position, in which the movable guide bar 233 is moved or retracted along the Z-axis to further expose the collection slot 170*c* and assist in depositing the pouch 110 in the collection bin 172*c*.

In one example, with reference back to FIG. 8, the guide actuator 234 includes, but is not limited to, a linear actuator having a movable or translatable linear rod. The guide actuator 234 may be an electric linear actuator or a pneumatic linear actuator. The guide actuator 234 is in communication with the controller 130 (FIG. 1) over a communication media that facilitates the transfer of data, power, etc. In the instance of the guide actuator 234 as a pneumatic linear actuator, the guide actuator 234 may also be in communication with a source of pressurized air. In one example, the guide actuator 234 is responsive to one or more control signals from the controller 130 to retract the linear rod and extend the linear rod in a single actuation cycle. The linear rod of the guide actuator 234 is coupled to the movable guide bar 233 on an end of the movable guide bar 233, which is opposite the end of the movable guide bar 233 proximate the pouch cutting blade 272 during the cutting operation of the pouch 110. As will be discussed, once the cutting operation for the pouch 110 is complete, the controller 130 transmits the one or more control signals to the guide actuator 234 to retract the linear rod to move the movable guide bar 233 relative to the first table surface 132 along the Z-axis toward the second table end 138. This movement of the movable guide bar 233 causes the pouch 110 resting on the movable guide bar 233 to contact the fingers 232*a*, 232*b*. The contact between the fingers 232*a*, 232*b* and the pouch 110 as the movable guide bar 233 continues to retract toward the second table end 138 causes the pouch 110 to slide off the movable guide bar 233 and fall through the collection slot 170*c* into the collection bin 172*c*. The extension of the linear rod moves the movable guide bar 233 back to prepare for a subsequent cutting operation for the pouch 110.

With reference back to FIG. 7, the verification gauge 151 is coupled to the first table surface 132 so as to be opposite the human-machine interface 128. The verification gauge 151 is generally coupled so as to be adjacent to the transmitter bar 160. The verification gauge 151 comprises opposing sidewalls 230, which extend outwardly from the first table surface 132 along the Y-axis. The sidewalls 230 are substantially planar, and are spaced apart by a predetermined width W1 (FIG. 2). The predetermined width W1 is an acceptable width of the first battery cell 102 for positioning within a recycling receptacle, such as a shipping container, for recycling. The verification gauge 151 provides an easy way for the operator to ensure that the first battery cell 102 is at the acceptable width without requiring the use of measuring devices, for example, as the pouch 110 of the first battery cell 102 is folded by the operator and taped. In the example of FIG. 2, the first battery cell 102 with the pouch 110 taped is positioned within the verification gauge 151 to ensure that the first battery cell 102 meets the predefined width requirements for positioning within the recycling receptacle for recycling.

The battery guide system 122 guides the battery cell 102, 104 into and out of the cutting operation performed by at least one of the battery lead tab cutting system 124 and the battery pouch cutting system 126. Generally, the battery guide system 122 is movable from a first position, proximate the first table end 136, to a second position for the cutting operation. In one example, the battery guide system 122 includes a battery guide flange 240, a battery guide base 242, at least one or a pair of guide arms 244 and a guide handle 246. With reference to FIG. 4, the battery guide flange 240 extends for a distance along the horizontal or X-axis that is sufficient to couple the battery guide flange 240 to the battery cell 102, 104 between the lead tabs 106, 108. In one example, the battery guide flange 240 is substantially L-shaped, and has a guide lip 248 that extends axially outward from a flange base 250. The flange base 250 extends along the Y-axis, and is sized to be positioned adjacent to the first end 102*b*, 104*b* of the battery cell 102, 104. The guide lip 248 extends outwardly from the flange base 250 at an end of the flange base 250 such that the guide lip 248 is coupled to or is in contact with a surface of the battery cell 102, 104 when the battery cell 102, 104 is coupled to the battery guide system 122. By providing the guide lip 248 that extends over or on top of the surface of the battery cell 102, 104 along with the flange base 250 that extends along the first end 102*b*, 104*b* of the battery cell 102, 104, the guide lip 248 and the flange base 250 assist in holding the battery cell 102, 104 during the cutting operation. The battery guide flange 240 is generally coupled to the recycling table 120 such that an end of the flange base 250 opposite the guide lip 248 is in contact with or adjacent to the first table surface 132.

The battery guide base 242 is coupled to the battery guide flange 240. The battery guide base 242 is substantially rectangular, and is sized to be received within the guide slot 228 and the second guide slot 229. The battery guide base 242 has a first base end 242a opposite a second base end 242b. The battery guide base 242 is coupled to the recycling table 120 such that a surface 242c of the battery guide base 242 is slightly raised above the first table surface 132. The battery guide flange 240 is coupled to the second base end 242b. With reference to FIG. 4, the battery guide base 242 includes two opposed rails 252. The opposed rails 252 generally extend along the Z-axis on opposed sides of the battery guide base 242 from the first base end 242a to the second base end 242b. The opposed rails 252 slidably engage with the second channels 224 of the second guide slot 229 when the battery guide base 242 is in a first position, and engage with the first channels 222 of the guide slot 228 when the battery guide base 242 is in the second position. The opposed rails 252 have a substantially square cross-section to be received within the respective first channels 222 and second channels 224. The battery guide base 242 provides stability to the movement of the battery guide system 122 relative to the recycling table 120.

The at least one or a pair of guide arms 244, in this example, comprises two guide arms 244a, 244b. The guide arms 244a, 244b are coupled to the second base end 242b at the surface 242c of the battery guide base 242. The guide arms 244a, 244b are coupled to the battery guide base 242 so as to be spaced apart from each other and proximate the sides of the battery guide base 242. The guide arms 244a, 244b are substantially planar, and rectangular in cross-section. The guide arms 244a, 244b have a length sized to enable a movement of the battery guide base 242 and the battery guide flange 240 from the first position (FIG. 2) to the second position (FIG. 4). In the second position, the battery cell 102, 104 coupled to the battery guide base 242 and the battery guide flange 240 is positioned for the cutting operation. In this example, the guide arms 244a, 244b are coupled together via a link 254 at an end opposite the respective end of the guide arms 244a, 244b coupled to the battery guide base 242. The link 254 ensures an equal or even movement of the guide arms 244a, 244b, and thus, the battery guide base 242 and the battery guide flange 240, relative to the recycling table 120. The respective end of the guide arms 244a, 244b proximate the link 254 are coupled to the guide handle 246.

The guide handle 246 is coupled to the guide arms 244a, 244b so as to be proximate the first table end 136 when the battery guide base 242 and the battery guide flange 240 are in the first position. The guide handle 246 is substantially U-shaped, however, any graspable member may be used to enable a user to move the battery guide base 242 and the battery guide flange 240 between the first position and the second position. In this example, the guide handle 246 is coupled to the guide arms 244a, 244b via welding, however, mechanical fasteners, adhesives, etc. may be used. In addition, the guide handle 246 may be integrally formed with the guide arms 244a, 244b via additive manufacturing, casting, etc. As will be discussed, generally, the user may grasp the guide handle 246 to push the battery guide system 122, and thus, the battery cell 102, 104, from the first position to the second position for the cutting operation. Once the cutting operation is complete, the operator may grasp the guide handle 246 and pull the battery guide system 122, and thus, the battery cell 102, 104 from the second position to the first position.

With reference back to FIG. 1, the battery lead tab cutting system 124 is controlled by the controller 130 to cut the lead tabs 106, 108 off of the battery cell 102, 104. By removing the lead tabs 106, 108, the lead tabs 106, 108 may be recycled. In addition, by removing the lead tabs 106, 108, the battery cell 102, 104 may also be recycled. The removal of the lead tabs 106, 108 also reduces a size of the battery cell 102, 104, which enables additional battery cells 102, 104 to be received within the recycling receptacle, such as a shipping container, for shipping the battery cells 102, 104 for recycling. In one example, the battery lead tab cutting system 124 includes a first actuator 260, the first tab cutting blade 262 and the second tab cutting blade 264. The first actuator 260 includes, but is not limited to, a linear actuator having a movable or translatable linear rod. The first actuator 260 may be an electric linear actuator or a pneumatic linear actuator. The first actuator 260 is in communication with the controller 130 over a communication media that facilitates the transfer of data, power, etc. In the instance of the first actuator 260 as a pneumatic linear actuator, the first actuator 260 may also be in communication with a source of pressurized air. In one example, the first actuator 260 is responsive to one or more control signals from the controller 130 to extend the linear rod and retract the linear rod in a single actuation cycle.

The first tab cutting blade 262 and the second tab cutting blade 264 are movable substantially simultaneously together with the first actuator 260. In one example, the first tab cutting blade 262 and the second tab cutting blade 264 are coupled together, via a supporting structure, such as a crossbar, which is coupled to the linear rod so that a movement of the linear rod of the first actuator 260 moves the first tab cutting blade 262 and the second tab cutting blade 264 substantially simultaneously relative to the recycling table 120. Stated another way, an actuation of the first actuator 260 by the controller 130 is configured to move the first tab cutting blade 262 and the second tab cutting blade 264 toward the recycling table 120 to cut the lead tabs 106, 108 from the battery cell 102, 104 and to retract the first tab cutting blade 262 and the second tab cutting blade 264 after the lead tabs 106, 108 are cut. The first actuator 260 is coupled to the recycling table 120 via one or more support structures or elevated platforms such that the first actuator 260 is operable in the actuation cycle to move the first tab cutting blade 262 and the second tab cutting blade 264 simultaneously to remove the lead tabs 106, 108 from the battery cell 102, 104 and retract the first tab cutting blade 262 and the second tab cutting blade 264. The first tab cutting blade 262 and the second tab cutting blade 264 are each composed of metal or metal alloy, and have a sharp tip 262a, 264a for cutting through the lead tabs 106, 108 to sever or separate the lead tabs 106, 108 from the battery cell 102, 104. Generally, the first tab cutting blade 262 and the second tab cutting blade 264 have a width along the Z-axis that is substantially different and larger than a width of the lead tabs 106, 108 to ensure that the first tab cutting blade 262 and the second tab cutting blade 264 remove an entirety of the respective lead tab 106, 108 in a single cut or actuation cycle of the first actuator 260.

The battery pouch cutting system 126 is controlled by the controller 130 to cut the pouch 110 off of the second battery cell 104. By removing the pouch 110, the size of the second battery cell 104 is reduced, which enables additional battery cells 102, 104 to be received within the recycling receptacle to ship the battery cells 102, 104 for recycling. It should be noted that the battery pouch cutting system 126 trims the pouch 110 of the second battery cell 104 without contacting the seal 112 (FIG. 1). The battery pouch cutting system 126 removes the pouch 110 proximate the seal 112, while leaving the seal 112 intact. In one example, the battery pouch cutting system 126 includes a second actuator 270 and a pouch cutting blade 272. The second actuator 270 includes, but is not limited to, a linear actuator having a movable or translatable linear rod. The second actuator 270 may be an electric linear actuator or a pneumatic linear actuator. The second actuator 270 is in communication with the controller 130 over a communication media that facilitates the transfer of data, power, etc. In the instance of the second actuator 270 as a pneumatic linear actuator, the second actuator 270 may also be in communication with a source of pressurized air. In one example, the second actuator 270 is responsive to one or more control signals from the controller 130 to extend the linear rod and retract the linear rod in a single actuation cycle.

The pouch cutting blade 272 is movable by the second actuator 270. In one example, the linear rod of the second actuator 270 is coupled to the pouch cutting blade 272 so that the second actuator 270 is configured to move the pouch cutting blade 272. Stated another way, an actuation of the second actuator 270 by the controller 130 is configured to move the pouch cutting blade 272 toward the recycling table 120 to cut the pouch 110 from the second battery cell 104 and to retract the pouch cutting blade 272 after the pouch 110 is cut. The second actuator 270 is coupled to the recycling table 120 via one or more support structures or elevated platforms such that the second actuator 270 is operable in the actuation cycle to move the pouch cutting blade 272 to remove the pouch 110 from the second battery cell 104 and to retract the pouch cutting blade 272. The pouch cutting blade 272 is composed of metal or metal alloy, and has a sharp tip 272a for cutting through the pouch 110 to sever or separate the pouch 110 from the second battery cell 104. The pouch cutting blade 272 has a length along the X-axis that is substantially different and larger than a length of the second battery cell 104 along the X-axis to ensure that the pouch cutting blade 272 removes an entirety of the pouch 110 in a single cut or actuation cycle of the second actuator 270. Generally, the pouch cutting blade 272 extends along an axis, which is substantially perpendicular to a respective axis along which the first tab cutting blade 262 and the second tab cutting blade 264 extend. It should be noted that while the battery lead tab cutting system 124 and the battery pouch cutting system 126 are described herein as each comprising a respective actuator, other arrangements may be used.

As the battery cell 102, 104 may be a live battery cell 102, 104, each of the first tab cutting blade 262, the second tab cutting blade 264 and the pouch cutting blade 272 are coupled to the respective actuator 260, 270 and the recycling table 120 so as to be electrically isolated from each other. Thus, in certain instances, the first tab cutting blade 262 and the second tab cutting blade 264 may be coupled to the crossbar or support structure so as to be electrically isolated from each other, and electrically isolated from the first actuator 260. The pouch cutting blade 272 may be coupled to a support structure so as to be electrically isolated from the first tab cutting blade 262 and the second tab cutting blade 264, and the second actuator 270. It should be noted that in certain examples, a single support structure may be used for the first tab cutting blade 262, the second tab cutting blade 264 and the pouch cutting blade 272 so long as each of the first tab cutting blade 262, the second tab cutting blade 264 and the pouch cutting blade 272 are electrically isolated from each other.

The human-machine interface 128 is in communication with the controller 130 over a communication medium that facilitates the transfer of power, data, etc., such as a bus. In one example, the human-machine interface 128 includes a housing 280 and a plurality of buttons 282. The housing 280 is coupled to the recycling table 120 on the first table surface 132 so as to be outside of the light curtain of the safety system 144. This enables the operator to interface with the human-machine interface 128 without interfering with or crossing the light curtain of the safety system 144. In this example, the plurality of buttons 282 include three buttons 282a-282c. The buttons 282a-282c are movable relative to the housing 280 to generate a signal, which is communicated to the controller 130. In this example, the button 282a is depressible or responsive to input by the operator to reset the light curtain or reset the safety system 144. The button 282b is depressible or responsive to input by the operator to actuate the first actuator 260 of the battery lead tab cutting system 124 to cut the lead tabs 106, 108 (in the example of the first battery cell 102). The button 282c is depressible or responsive to input by the operator to actuate the first actuator 260 of the battery lead tab cutting system 124 to cut the lead tabs 106, 108 and to actuate the second actuator 270 of the battery pouch cutting system 126 to cut the pouch 110 (in the example of the second battery cell 104).

The controller 130 includes at least one processor 290 and a computer-readable storage device or media 292. The processor 290 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 130, a semiconductor-based microprocessor (in the form of a microchip or chip set), any combination thereof, or generally any device for executing instructions. The computer readable storage device or media 292 may include volatile and nonvolatile storage in read-only memory (ROM), random-access memory (RAM), and keep-alive memory (KAM), for example. KAM is a persistent or non-volatile memory that may be used to store various operating variables while the processor 290 is powered down. The computer-readable storage device or media 292 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 130 in controlling the battery cell recycling system 100. Although only one controller 130 is shown in FIG. 1, embodiments of the battery cell recycling system 100 can include any number of controllers 130 that communicate over any suitable communication medium or a combination of communication mediums and that cooperate to process the sensor signals, perform logic, calculations, methods, and/or algorithms, and generate control signals to automatically control features of the battery cell recycling system 100.

Figure 5:
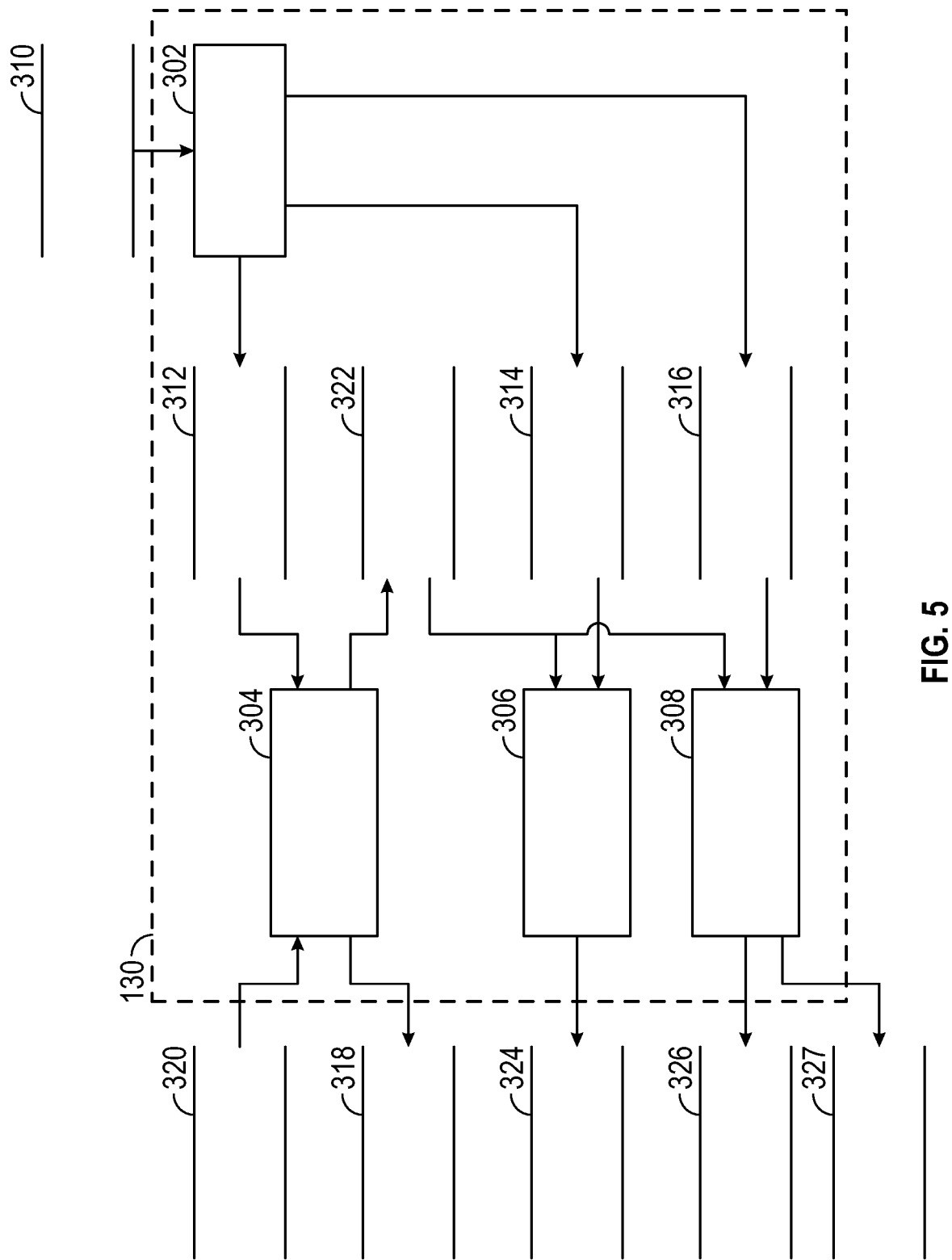
FIG. 5 is a dataflow diagram illustrating a control system of the battery cell recycling system, in accordance with various embodiments.

For example, as shown in more detail with regard to FIG. 5 and with continued reference to FIGS. 1-4, a dataflow diagram illustrates various embodiments of a control system of the battery cell recycling system 100, which may be embedded within the controller 130. Various embodiments of the control system of the battery cell recycling system 100 according to the present disclosure can include any number of sub-modules embedded within the controller 130. As can be appreciated, the sub-modules shown in FIG. 5 can be combined and/or further partitioned to similarly cut at least one of the lead tabs 106, 108 and the pouch 110. Inputs to the battery cell recycling system 100 may be received from the safety system 144 (FIG. 1), received from the human-machine interface 128 (FIG. 1), received from other control modules (not shown) associated with the battery cell recycling system 100, and/or determined/modeled by other sub-modules (not shown) within the controller 130. In various embodiments, the battery cell recycling system 100 includes a human-machine interface manager module 302, a safety control module 304, a lead tab cutting control module 306 and a pouch cutting control module 308.

The human-machine interface (HMI) manager module 302 receives user input data 310 from the human-machine interface 128. The HMI manager module 302 processes the user input data 310 and determines whether input has been received from one of the buttons 282a-282c. If user input has been received to the button 282a to reset the safety system 144, the HMI manager module 302 outputs reset data 312 to the safety control module 304. The reset data 312 is data to reset the safety system 144 from the alert state to the active state. If user input has been received to the button 282b to cut the lead tabs 106, 108 associated with the first battery cell 102, for example, the HMI manager module 302 outputs tab cut data 314 to the lead tab cutting control module 306. The tab cut data 314 is one or more control signals to the first actuator 260 to cycle or extend and retract the linear rod to cut the lead tabs 106, 108 off of the battery cell 102, 104. If user input has been received to the button 282c to cut the lead tabs 106, 108 and the pouch 110 associated with the second battery cell 104, for example, the HMI manager module 302 outputs the tab cut data 314 to the lead tab cutting control module 306 and pouch cut data 316 to the pouch cutting control module 308. The pouch cut data 316 is one or more control signals to the second actuator 270 to cycle or extend and retract the linear rod to cut the pouch 110 off of the second battery cell 104.

The safety control module 304 receives as input the reset data 312. Based on the reset data 312, if the safety system 144 is in the alert state, the safety control module 304 outputs transmitter data 318. The transmitter data 318 is data to the transmitter bar 160 of the safety system 144 to reset to the active state, and to transmit the light beams to the receiver bar 162. The safety control module 304 also receives as input receiver data 320. The receiver data 320 is data from the safety system 144 that indicates that the light has not been detected by the receiver bar 162 such that the safety system 144 is in an alert state. Based on the receiver data 320, the safety control module 304 sets alert data 322 for the lead tab cutting control module 306 and the pouch cutting control module 308. The alert data 322 is data that indicates the safety system 144 is in the alert state, and in this example, the light is not detected by the receiver bar 162 such that the operator has crossed the safety system 144 or the light curtain.

The lead tab cutting control module 306 receives as input the tab cut data 314. Based on the tab cut data 314, the lead tab cutting control module 306 determines whether alert data 322 has been received that indicates the safety system 144 is in the alert state. If the alert data 322 has not been received, the lead tab cutting control module 306 outputs tab cut cycle data 324. The tab cut cycle data 324 is one or more control signals to the first actuator 260 to cycle or extend and retract the linear rod to cut the lead tabs 106, 108 from the battery cell 102, 104 with the first tab cutting blade 262 and the second tab cutting blade 264. If the alert data 322 has been received, the lead tab cutting control module 306 inhibits a motion of the first actuator 260 and does not output the tab cut cycle data 324.

The pouch cutting control module 308 receives as input the pouch cut data 316. Based on the pouch cut data 316, the pouch cutting control module 308 determines whether alert data 322 has been received that indicates the safety system 144 is in the alert state. If the alert data 322 has not been received, the pouch cutting control module 308 outputs pouch cut cycle data 326. The pouch cut cycle data 326 is one or more control signals to the second actuator 270 to cycle or extend and retract the linear rod to cut the pouch 110 from the second battery cell 104 with the pouch cutting blade 272. If the alert data 322 has been received, the pouch cutting control module 308 inhibits a motion of the second actuator 270 and does not output the pouch cut cycle data 326. Based on the output of the pouch cut cycle data 326, the pouch cutting control module 308 also outputs guide bar cycle data 327. The guide bar cycle data 327 is one or more control signals to the guide actuator 234 to cycle or retract and extend the linear rod to move the movable guide bar 233 to enable the pouch 110 to enter into the collection bin 172c. It should be noted that in certain instances, the output of the guide bar cycle data 327 may be after a predetermined period of time from the output of the pouch cut cycle data 326, if desired.

Figure 6:
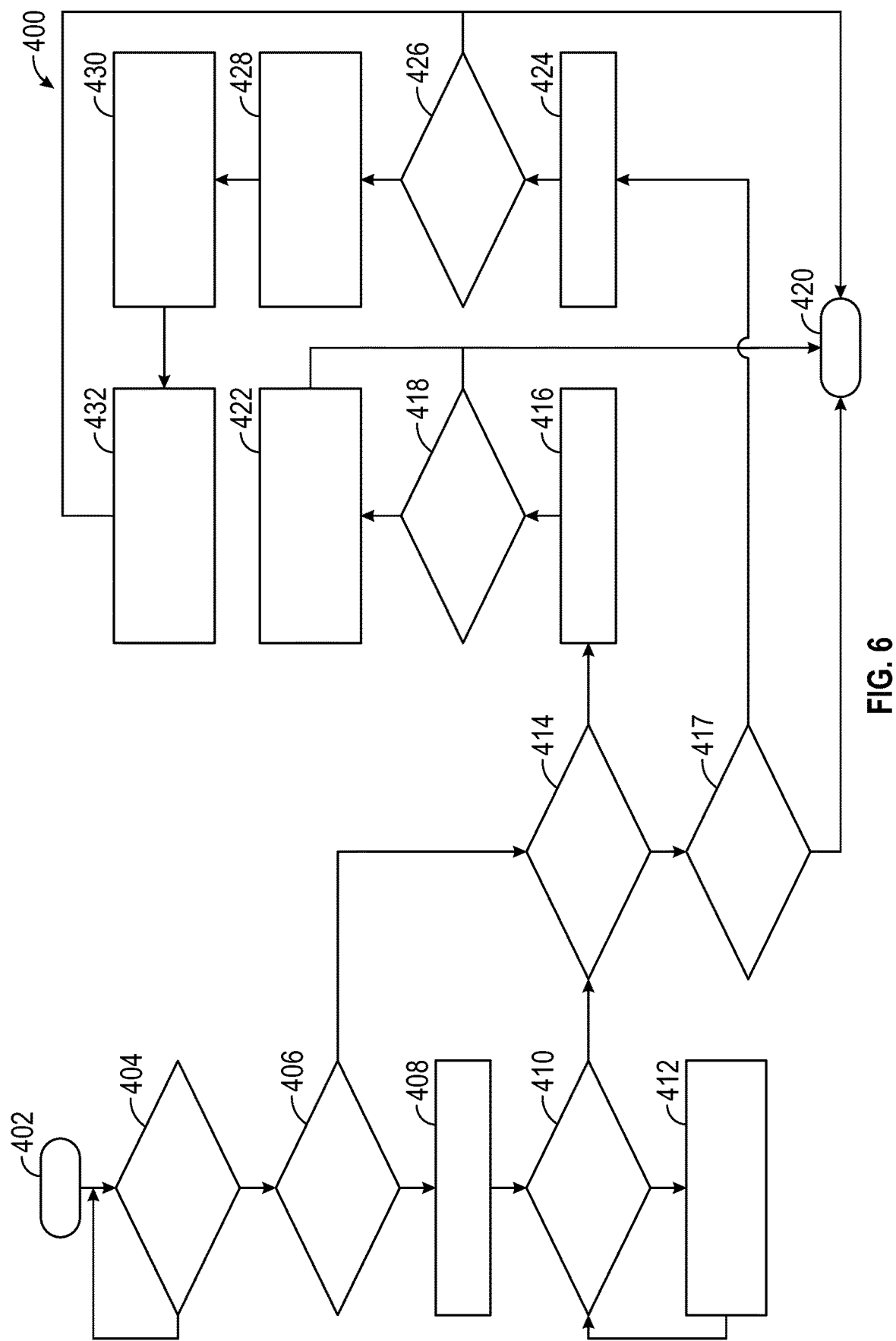
FIG. 6 is a flowchart illustrating a method that can be performed by the battery cell recycling system in accordance with various embodiments.

Referring now to FIG. 6, and with continued reference to FIGS. 1-5, a flowchart illustrates a method 400 that can be performed by the battery cell recycling system 100 of FIG. 1 in accordance with the present disclosure. In one example, the method 400 is performed by the processor 290 of the controller 130. As can be appreciated in light of the disclosure, the order of operation within the method 400 is not limited to the sequential execution as illustrated in FIG. 6, but may be performed in one or more varying orders as applicable and in accordance with the present disclosure. In various embodiments, the method 400 can be scheduled to run based on one or more predetermined events, and/or may run continuously during operation of the battery cell recycling system 100.

The method 400 begins at 402. At 404, the method 400 determines whether user input has been received to the human-machine interface 128. If true, the method 400 proceeds to 406. Otherwise, the method 400 loops.

At 406, the method 400 determines whether the user input received was to the button 282a, or whether the user input is a request to reset the safety system 144. If true, the method 400 proceeds to 408. At 408, the method 400 receives the receiver data 320 from the safety system 144. At 410, the method 400 determines whether the safety system 144 is in the alert state based on the receiver data 320. If the safety system 144 is in the alert state, the method 400 proceeds to 412. At 412, the method 400 outputs the transmitter data 318 to reset the safety system 144 such that the transmitter bar 160 of the light curtain transmits the light to the receiver bar 162. The method 400 loops to 410.

At 414, the method 400 determines whether input was received to cut the lead tabs 106, 108, or if input was received to the button 282b. If true, the method 400 proceeds to 416. Otherwise, the method 400 proceeds to 417. At 416, the method 400 receives the receiver data 320 from the safety system 144. At 418, the method 400 determines whether the safety system 144 is in the alert state based on the receiver data 320. If the safety system 144 is in the alert state, the method 400 ends at 420. If the safety system 144 is not in the alert state at 418, the method 400, at 422, outputs one or more control signals to the first actuator 260 to cycle or extend and retract the linear rod to move the tab cutting blades 262, 264 to sever the lead tabs 106, 108 from the battery cell 102, 104. The method 400 ends at 420.

At 417, the method 400 determines whether input was received to cut the lead tabs 106, 108 and the pouch 110, or if input was received to the button 282c. If true, the method 400 proceeds to 424. Otherwise, the method 400 ends at 420. At 424, the method 400 receives the receiver data 320 from the safety system 144. At 426, the method 400 determines whether the safety system 144 is in the alert state based on the receiver data 320. If the safety system 144 is in the alert state, the method 400 ends at 420. If the safety system 144 is not in the alert state at 426, the method 400, at 428, outputs one or more control signals to the first actuator 260 to cycle or extend and retract the linear rod to move the tab cutting blades 262, 264 to sever the lead tabs 106, 108 from the second battery cell 104. At 430, the method 400 outputs one or more control signals to the second actuator 270 to cycle or extend and retract the linear rod to move the pouch cutting blade 272 to sever the pouch 110 from the second battery cell 104. At 432, the method 400 outputs one or more control signals to the guide actuator 234 to cycle or retract and extend the linear rod to move the movable guide bar 233 to drop the pouch 110 into the collection bin 172c. The method 400 ends at 420.

Thus, generally, in order to use the battery cell recycling system 100, with reference to FIG. 2A, the operator loads the battery cell 102, 104 onto the battery guide base 242 such that the first end 102b, 104b of the battery cell 102, 104 is disposed under the guide lip 248 of the battery guide flange 240 (FIG. 4). In the example of the first battery cell 102, the operator grasps the handle 180 (FIG. 3), and rotates the handle 180, and thus, the shaft 190 about 180 degrees toward the first table end 136, toward the user or counterclockwise. The rotation of the shaft 190 rotates the folding arm 182. As the folding arm 182 rotates, the lip 196a contacts the pouch 110, and the continued rotation of the folding arm 182 moves the pouch 110 toward the operator, thereby folding the pouch 110 over the first battery cell 102, as shown in FIG. 9. With reference to FIGS. 2A and 9, with the pouch 110 folded over the first battery cell 102 and held in place by the folding arm 182, the operator may dispense the adhesive tape for the predetermined length identified by the marking 157. The adhesive tape may be applied to the pouch 110 and the first battery cell 102 to secure the folded pouch 110 to the first battery cell 102. The operator may then rotate the handle 180 clockwise to move the folding arm 182 back to the first position.

Figure 7:
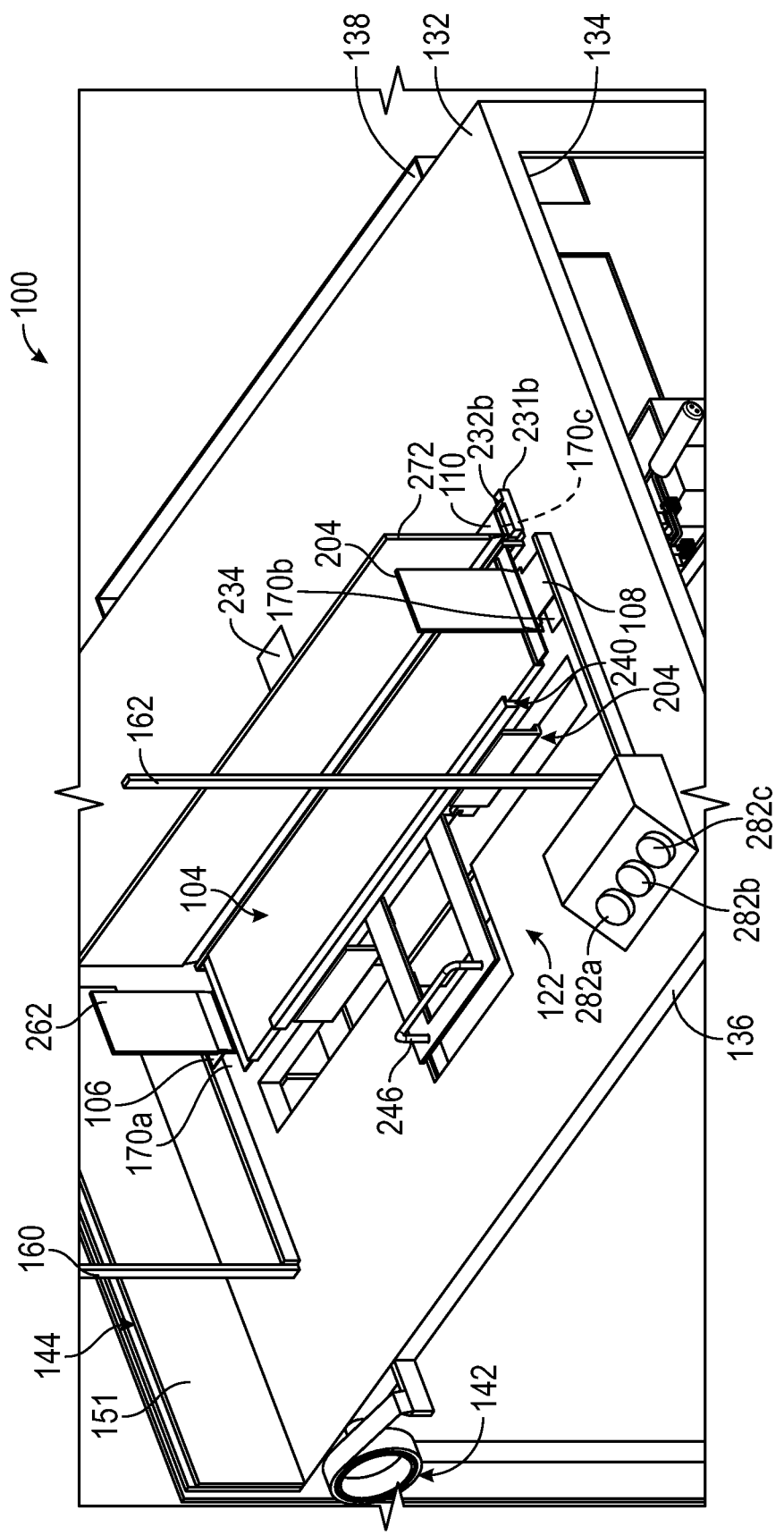
FIG. 7 is a front perspective view of the recycling table, in which the second battery cell is coupled to the battery guide system, the battery guide system is in the second position, the block arms are in the second position, and a battery tab cutting blade and a pouch cutting blade have been actuated to remove lead tabs and a pouch associated with the second battery cell.

The operator grasps the guide handle 246, and uses the guide handle 246 to advance or push the battery guide flange 240, the battery guide base 242, and thus, the battery cell 102, 104 from the first position (FIG. 2A) to the second position for the cutting operation (FIG. 7). In the example of the second battery cell 104, as the second battery cell 104 is pushed into the second position for the cutting operation, the pouch 110 follows the incline of the ramp surfaces 220, which assists in directing the pouch 110 through the guide slots 226a and over the collection slot 170c. In the example of the first battery cell 102, as the first battery cell 102 is pushed into the second position for the cutting operation, the first portion 101 follows the incline of the ramp surfaces 220. With the battery cell 102, 104 in the second position, with reference to FIG. 4, the operator grasps the second handle 202 of the blocking arm system 184 and pushes the second handle 202 toward the first table surface 132 to rotate the block arms 204 from the first position (FIG. 4) to the second position (FIG. 7).

Figure 8:
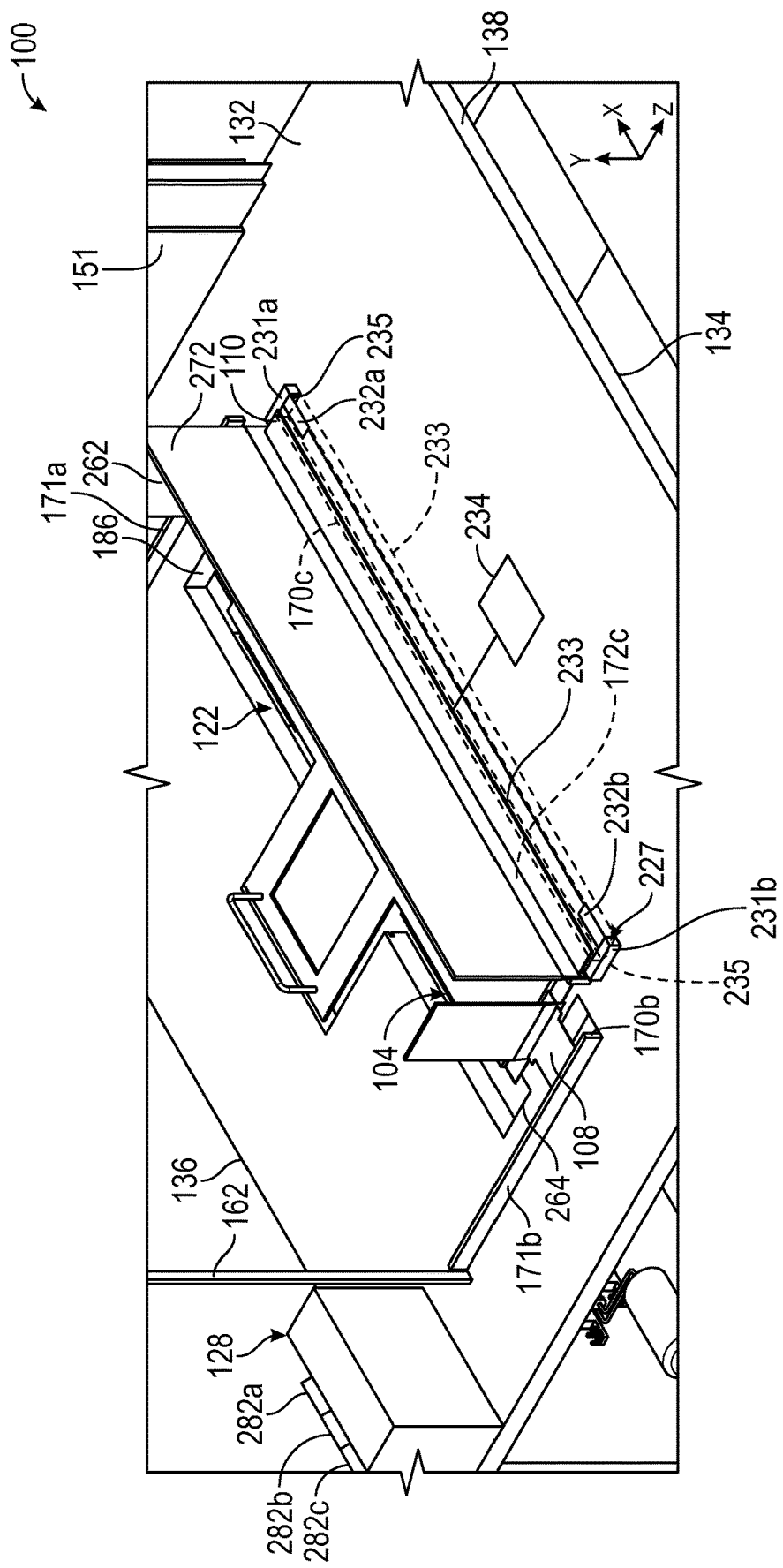
FIG. 8 is a rear perspective view of FIG. 7.
Figure 8A:
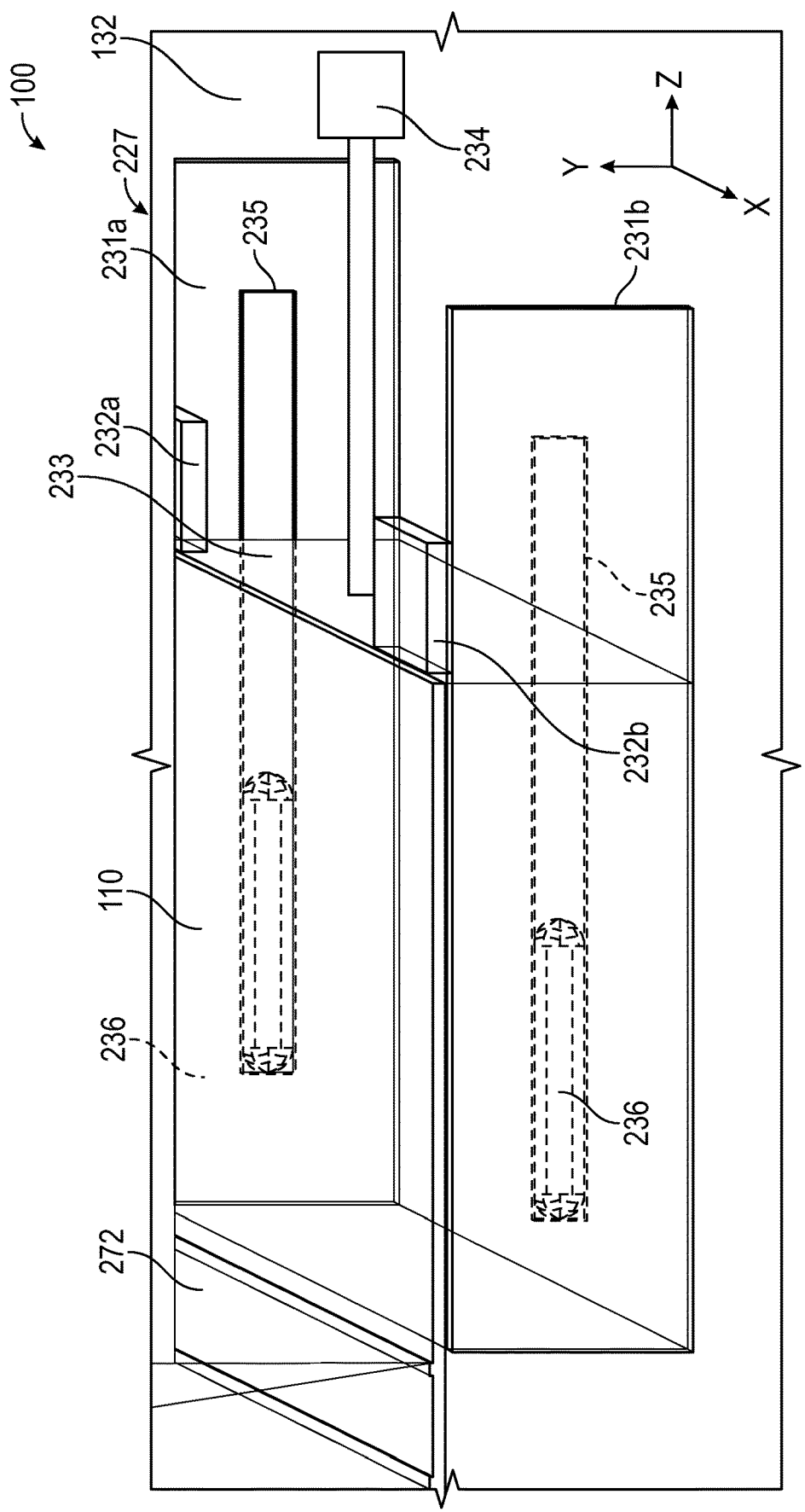
FIG. 8A is a detail view of a second guide bar assembly associated with the battery cell recycling system.

With reference to FIG. 7, the block arms 204 are shown in the second position. The battery cell 102, 104 is shown positioned for the cutting operation. In the example of FIG. 7, the second battery cell 104 is illustrated, however, the first battery cell 102 would be positioned substantially the same as the second battery cell 104. With reference to FIG. 8, in the second position for the cutting operation, in the example of the second battery cell 104, the pouch 110 extends over the collection slot 170c and rests on the second guide bar assembly 227. With the battery cell 102, 104 in the second position, and the operator out of the light emitted by the transmitter bar 160, the operator presses the button 282a to reset the safety system 144. In the example of the second battery cell 104, the operator then presses the button 282c to actuate the first actuator 260 to cycle the tab cutting blade 262, 264 to cut the lead tabs 106, 108; and to actuate the second actuator 270 cycle the pouch cutting blade 272 to cut the pouch 110. In the example of the first battery cell 102, the operator then presses the button 282b to actuate the first actuator 260 to cycle the tab cutting blade 262, 264 to cut the lead tabs 106, 108. The operator may remove the second battery cell 104, and position the second battery cell 104 for shipping and recycling. The operator may remove the first battery cell 102 with the folded pouch 110, and position the first battery cell 102 within the verification gauge 151 as shown in FIG. 2 to ensure that the first battery cell 102 with the folded pouch 110 has the predetermined width W1 for shipping for recycling. Once the first battery cell 102 has the predetermined width W1, the first battery cell 102 can be positioned for shipping and recycling.

Thus, the battery cell recycling system 100 enables an operator to remove the lead tabs 106, 108 associated with the battery cell 102, 104 for separate recycling without requiring manual cutting of the lead tabs 106, 108. The use of the battery cell recycling system 100 increases cycle time, by eliminating manual cutting of the lead tabs 106, 108, while also providing repeatability and consistency in the battery cell 102, 104 that are received for recycling. The battery cell recycling system 100 also enables the operator to prepare the battery cell 102, 104 for shipping for recycling by either taping the pouch 110 to reduce the size of the first battery cell 102 or by cutting the pouch 110 to reduce the size of the second battery cell 104. The reduced size of the battery cell 102, 104 enables a larger quantity of the battery cells 102, 104 to be received within the recycling receptacle, such as a shipping container, and thus, is more efficient for recycling of the battery cells 102, 104.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A battery cell recycling system, comprising:
a recycling table having a first table surface opposite a second table surface, the recycling table including at least one collection slot defined through the first table surface and the second table surface, and at least one collection bin coupled to the second table surface in communication with the at least one collection slot;
a battery guide system coupled to the recycling table, the battery guide system configured to receive a battery cell including a first lead tab, a second lead tab and a pouch, the battery guide system movable between a first position and a second position, and in the second position, at least one of the first lead tab, the second lead tab and the pouch is disposed over the at least one collection slot;
at least one actuator configured to move, in response to a controller, at least one cutting blade to remove at least one of the first lead tab, the second lead tab and the pouch from the battery cell in the second position of the battery guide system such that the at least one of the first lead tab, the second lead tab and the pouch is received in the at least one collection bin; and
a safety system disposed proximate the battery guide system configured to observe whether a user has crossed the safety system and to generate signals based on the observation;
wherein the controller has a processor and is configured to:
receive the signals from the safety system that indicate the user has crossed the safety system; and
inhibit a motion of the at least one actuator based on the signals.

2. The battery cell recycling system of claim 1, wherein the safety system includes a light curtain.

3. The battery cell recycling system of claim 1, wherein the safety system includes a transmitter bar and a receiver bar disposed on opposite sides of the battery guide system from one another.

4. The battery cell recycling system of claim 1, further comprising a human-machine interface in communication with the controller, and the human-machine interface is configured to receive input from the user to reset the safety system and to actuate the at least one actuator.

5. The battery cell recycling system of claim 4, wherein based on the input from the user to reset the safety system and to actuate the at least one actuator, the controller is configured to output one or more control signals to the at least one actuator to move the at least one cutting blade.

6. The battery cell recycling system of claim 1, wherein the at least one collection slot further comprises a plurality of collection slots defined through the recycling table from the first table surface to the second table surface, the at least one collection bin comprises a plurality of collection bins, and each of the plurality of collection slots is in communication with a respective one of the plurality of collection bins.

7. The battery cell recycling system of claim 1, wherein the at least one cutting blade comprises a first tab cutting blade, a second tab cutting blade and a pouch cutting blade, each of the first tab cutting blade and the second tab cutting blade are configured to remove a respective one of the first lead tab and the second lead tab, and the pouch cutting blade is configured to remove the pouch.

8. The battery cell recycling system of claim 1, further comprising a tape dispenser coupled to the recycling table.

9. The battery cell recycling system of claim 1, further comprising a folding arm coupled to the recycling table and movable relative to the recycling table to fold the pouch over the battery cell.

10. The battery cell recycling system of claim 1, further comprising at least one ramp surface configured to contact the pouch and guide the pouch as the battery guide system moves between the first position and the second position.

11. A method for battery cell recycling, comprising:
providing a recycling table having a first table surface opposite a second table surface, the recycling table including at least one collection slot defined through the first table surface and the second table surface and at least one collection bin coupled to the second table surface in communication with the at least one collection slot, the recycling table including a safety system coupled to the recycling table configured to observe whether a user has crossed the safety system and to generate signals based on the observation;
receiving, by a processor, user input to cut at least one of a first lead tab, a second lead tab and a pouch associated with a battery cell;
receiving, by the processor, the signals from the safety system; and
outputting one or more control signals, by the processor, to at least one actuator to move at least one cutting blade to remove at least one of the first lead tab, the second lead tab and the pouch associated with the battery cell such that the at least one of the first lead tab, the second lead tab and the pouch is received in the at least one collection bin based on the signals from the safety system.

12. The method of claim 11, wherein based on the signals from the safety system, the method includes inhibiting a movement of the at least one cutting blade by the at least one actuator.

13. The method of claim 11, wherein the at least one collection slot comprises a plurality of collection slots, the at least one collection bin comprises a plurality of collection bins, each of the plurality of collection bins is associated with a respective one of the plurality of collection slots, and receiving the user input to cut the at least one of the first lead tab, the second lead tab and the pouch associated with the battery cell further comprises:
receiving, by the processor, user input to cut the first lead tab and the second lead tab; and
outputting the one or more control signals, by the processor, to the at least one actuator to move a first tab cutting blade and a second tab cutting blade to remove the first lead tab and the second lead tab such that the first lead tab is received in one of the plurality of collection bins and the second lead tab is received in a second one of the plurality of collection bins based on the signals from the safety system.

14. The method of claim 11, wherein the at least one collection slot comprises a plurality of collection slots, the at least one collection bin comprises a plurality of collection bins, each of the plurality of collection bins is associated with a respective one of the plurality of collection slots, and receiving the user input to cut the at least one of the first lead tab, the second lead tab and the pouch associated with the battery cell further comprises:
receiving, by the processor, user input to cut the first lead tab, the second lead tab and the pouch;
outputting one or more control signals, by the processor, to a first actuator to move a first tab cutting blade and a second tab cutting blade to remove the first lead tab and the second lead tab such that the first lead tab is received in one of the plurality of collection bins and the second lead tab is received in a second one of the plurality of collection bins based on the signals from the safety system; and
outputting one or more control signals, by the processor, to a second actuator to move a pouch cutting blade to remove the pouch such that the pouch is received in a third one of the plurality of collection bins based on the signals from the safety system.

15. A battery cell recycling system, comprising:
a recycling table having a first table surface opposite a second table surface, the recycling table including a plurality of collection slots defined through the first table surface and the second table surface, a plurality of collection bins coupled to the second table surface in communication with a respective one of the plurality of collection slots and a safety system disposed proximate a first table end of the recycling table, the safety system configured to observe whether a user has crossed the safety system and to generate signals based on the observation;
a battery guide system coupled to the recycling table, the battery guide system configured to receive a battery cell including a first lead tab, a second lead tab and a pouch, the battery guide system movable between a first position and a second position, and in the second position, the first lead tab, the second lead tab and the pouch are disposed over a respective one of the plurality of collection slots;
a controller, having a processor, configured to:
receive the signals from the safety system; and
output one or more control signals to at least one actuator based on the signals from the safety system, the at least one actuator configured to move at least one cutting blade to remove at least one of the first lead tab, the second lead tab and the pouch from the battery cell in the second position of the battery guide system such that the at least one of the first lead tab, the second lead tab and the pouch is received in the respective one of the plurality of collection bins.

16. The battery cell recycling system of claim 15, further comprising a human-machine interface in communication with the controller, and the human-machine interface is configured to receive input from the user to reset the safety system and to actuate the at least one actuator.

17. The battery cell recycling system of claim 16, wherein based on the input from the user to reset the safety system and to actuate the at least one actuator, the controller is configured to output the one or more control signals to the at least one actuator to move the at least one cutting blade.

18. The battery cell recycling system of claim 15, wherein the at least one cutting blade comprises a first tab cutting blade, a second tab cutting blade and a pouch cutting blade that are electrically isolated from each other, each of the first tab cutting blade and the second tab cutting blade are configured to remove a respective one of the first lead tab and the second lead tab, and the pouch cutting blade is configured to remove the pouch.

19. The battery cell recycling system of claim 15, further comprising a tape dispenser coupled to the recycling table and a folding arm coupled to the recycling table and movable relative to the recycling table to fold the pouch over the battery cell.

20. The battery cell recycling system of claim 15, further comprising at least one ramp surface configured to contact the pouch and guide the pouch as the battery guide system moves between the first position and the second position.

* * * * *